US011381525B2

(12) United States Patent
Sawamura et al.

(10) Patent No.: US 11,381,525 B2
(45) Date of Patent: Jul. 5, 2022

(54) COMMUNICATION APPARATUS, COMMUNICATION SYSTEM, AND COMMUNICATION CONTROL METHOD

(71) Applicant: FUJITSU LIMITED, Kawasaki (JP)

(72) Inventors: Shogo Sawamura, Osaka (JP); Masayuki Ono, Kawasaki (JP); Masanori Kondo, Kawasaki (JP); Toshihide Tsuzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 289 days.

(21) Appl. No.: 16/708,592

(22) Filed: Dec. 10, 2019

(65) Prior Publication Data
US 2020/0204502 A1      Jun. 25, 2020

(30) Foreign Application Priority Data

Dec. 21, 2018   (JP) .............................. JP2018-240286

(51) Int. Cl.
| | | |
|---|---|---|
| *H04L 49/552* | (2022.01) | |
| *H04L 12/437* | (2006.01) | |
| *H04L 12/46* | (2006.01) | |
| *H04L 45/586* | (2022.01) | |
| *H04L 45/00* | (2022.01) | |
| *H04L 49/253* | (2022.01) | |
| *H04L 45/24* | (2022.01) | |
| *H04L 41/0668* | (2022.01) | |

(52) U.S. Cl.
CPC .......... *H04L 49/552* (2013.01); *H04L 12/437* (2013.01); *H04L 12/4637* (2013.01); *H04L 41/0668* (2013.01); *H04L 45/22* (2013.01); *H04L 45/245* (2013.01); *H04L 45/586* (2013.01); *H04L 49/253* (2013.01)

(58) Field of Classification Search
None
See application file for complete search history.

(56) References Cited

U.S. PATENT DOCUMENTS

| | | | | |
|---|---|---|---|---|
| 2015/0172173 A1* | 6/2015 | Mitsumori | .............. | H04L 45/28 370/225 |
| 2015/0288620 A1* | 10/2015 | Yasuda | ................. | H04L 49/552 370/401 |

(Continued)

FOREIGN PATENT DOCUMENTS

| | | |
|---|---|---|
| JP | 2015-211402 A | 11/2015 |
| JP | 2015-220509 A | 12/2015 |

*Primary Examiner* — Gregory B Sefcheck
*Assistant Examiner* — Srinivasa R Reddivalam
(74) *Attorney, Agent, or Firm* — Fujitsu Patent Center

(57) ABSTRACT

An apparatus includes a first port coupled to a first apparatus through a ring line, a second port coupled to a second apparatus through a second line, the second apparatus disposed external to the ring line, the second line configured redundantly with a first line between the first apparatus and the second apparatus, a third port coupled to the first apparatus through a control line for a control signal concerning the first line, and circuitry that detects a fault in the control line, wherein the circuitry detects a fault in the second line, switches the second line from an active line to a standby line in accordance with the detection of the fault in the second line, and while the fault in the control line is detected, shuts down the first port in accordance with the detection of the fault in the second line.

15 Claims, 18 Drawing Sheets

(56) References Cited

U.S. PATENT DOCUMENTS

2015/0312121 A1\* 10/2015 Yasuda ............... H04B 7/14
370/243
2015/0333954 A1\* 11/2015 Yasuda ............... H04L 49/25
370/227

\* cited by examiner

COMMUNICATION APPARATUS, COMMUNICATION SYSTEM, AND COMMUNICATION CONTROL METHOD

CROSS-REFERENCE TO RELATED APPLICATION

This application is based upon and claims the benefit of priority of the prior Japanese Patent Application No. 2018-240286, filed on Dec. 21, 2018, the entire contents of which are incorporated herein by reference.

FIELD

The embodiment discussed herein is related to a communication apparatus, a communication system, and a communication control method.

BACKGROUND

There is a communication system in which an access line for accessing a ring network is made redundant by using a multi-chassis link aggregation (MC-LAG) technology. In a case where a fault occurs in the communication between communication apparatuses coupled to a redundant access line, a main signal path is switched to a bypass for a location of a fault by using, for example, an Ethernet (registered trademark; the same applies hereinafter) ring protection (ERP) function.

In the above instance, the monitoring control function of MC-LAG is additionally used so that a control signal path is also switched to a bypass for redundant system switchover for the communication apparatuses. Therefore, the time required for switching a main signal and a control signal becomes longer than in a case where only the main signal path is switched. Additionally, a bandwidth of the control signal is obtained for an increased number of links in accordance with a path length increase from a pre-switch state. This reduces the bandwidth of the main signal.

For example, Japanese Laid-open Patent Publication No. 2015-211402 is disclosed as a related art.

SUMMARY

According to an aspect of the embodiment, a communication apparatus includes a first port that is coupled to a first communication apparatus through a ring line, a second port that is coupled to a second communication apparatus through a second access line, the second communication apparatus being disposed external to the ring line, the second access line being configured redundantly with a first access line between the first communication apparatus and the second communication apparatus, a third port that is coupled to the first communication apparatus through a control line for transmitting and receiving a control signal concerning the first access line, and circuitry that detects a fault in the control line, wherein the circuitry detects a fault in the second access line, switches the second access line from an active line to a standby line in accordance with the detection of the fault in the second access line, and while the fault in the control line is detected, shuts down the first port in accordance with the detection of the fault in the second access line.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT

Meanwhile, in a case where a communication line between communication apparatuses is duplexed to use one communication line as an intra-portal link (IPL) for a control signal, even if a failure occurs in the IPL communication line or a failure occurs in the main signal, it may be controlled so as not to affect the main signal. Only a main signal path needs to be switched even if a fault occurs in a main signal communication line. This suppresses an increase in the time required for switchover and an increase in the bandwidth of the control signal.

However, when a fault occurs in the communication line for the IPL, it is difficult for the communication apparatuses to transmit and receive the control signal to and from each other. Therefore, a redundant system may not be able to achieve switchover. Consequently, if a fault further occurs, for example, in an access line of an active system, it might be practically difficult to maintain main signal communication.

In view of the above circumstances, it is desirable to provide a communication apparatus, a communication system, and a communication control method that are capable of maintaining main signal communication even if a fault occurs in a situation where the transmission of a control signal to a redundant partner communication apparatus is unachievable.

According to an aspect of an embodiment, it is possible to maintain communication even if a fault occurs in a situation where the transmission of a control signal to a redundant partner communication apparatus is unachievable.

Figure 1:
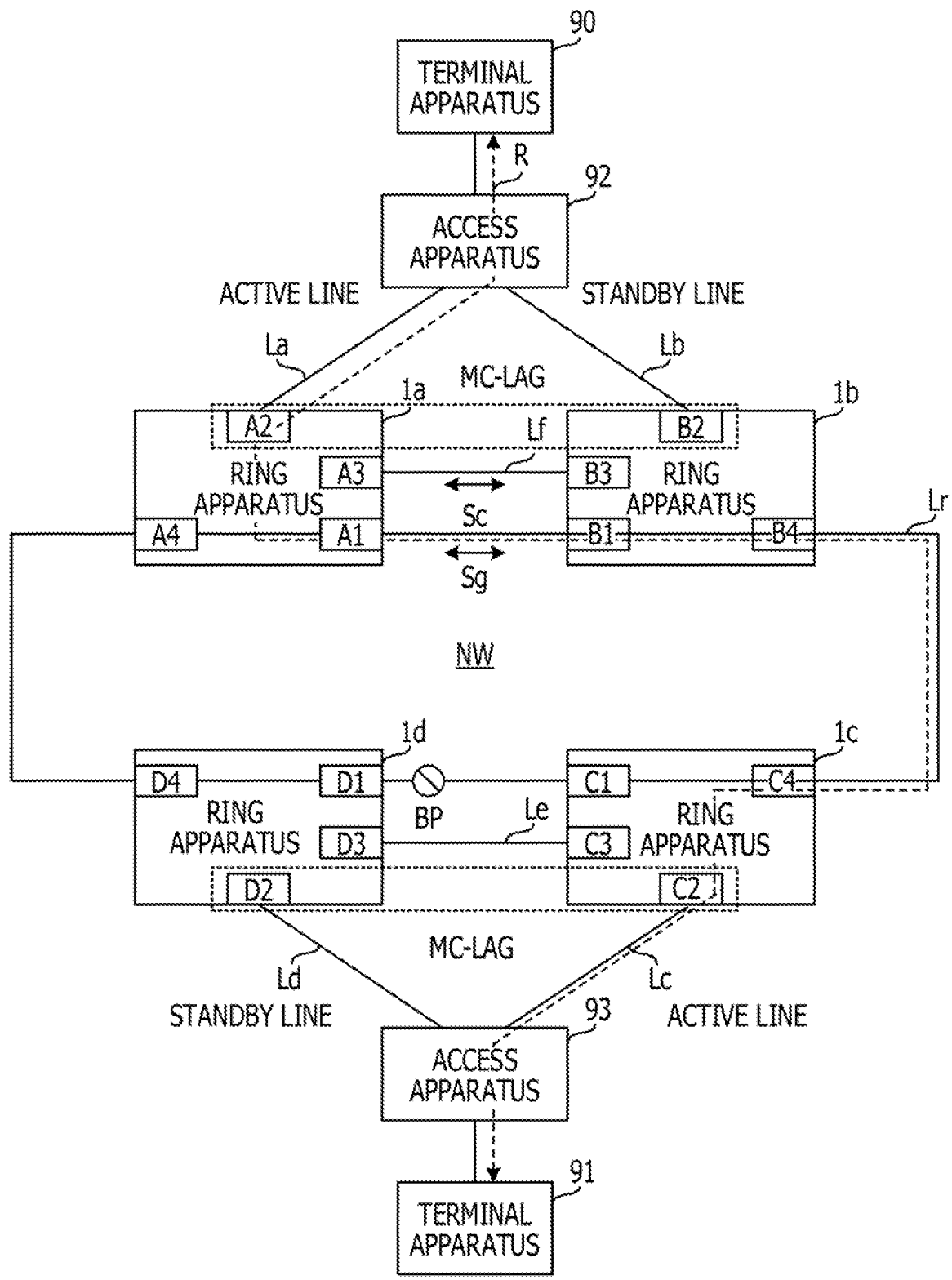
FIG. 1 is a configuration diagram illustrating an example of a communication system.

FIG. 1 is a configuration diagram illustrating an example of a communication system. The communication system includes terminal apparatuses 90 and 91 such as personal computers and smartphones, access apparatuses 92 and 93, and ring apparatuses 1a to 1d forming a ring network NW. For example, a layer 2 switch may be used as the access apparatuses 92 and 93 and the ring apparatuses 1a to 1d. However, the access apparatuses 92 and 93 and the ring apparatuses 1a to 1d are not limited to the layer 2 switch. A router or other relay apparatus may be used as access apparatuses 92 and 93 and the ring apparatuses 1a to 1d. The ring apparatuses 1a to 1d are examples of a communication apparatus. In the following example, however, operations of the communication apparatus 1a are described.

The terminal apparatuses 90 and 91 are respectively coupled to the access apparatuses 92 and 93 through, for example, a wired local area network (LAN) or a wireless LAN. The access apparatus 92 disposed toward the terminal apparatus 90 is coupled to the ring apparatuses 1a and 1b through redundantly paired access lines La and Lb, respectively. The access apparatus 93 disposed toward the terminal apparatus 91 is coupled to the ring apparatuses 1c and 1d through redundantly paired access lines Lc and Ld, respectively.

The ring apparatuses 1a to 1d are coupled to a ring line Lr by using, for example, the ring network NW. The ring line Lr has an ERP function. The ring apparatuses 1a to 1d respectively include ports A1 to A4, ports B1 to B4, ports C1 to C4, and ports D1 to D4. The ports A1 to A4, ports B1 to B4, ports C1 to C4, and ports D1 to D4 each include, for example, a transmitter for transmitting an optical signal and a receiver for receiving an optical signal.

The port A2 of the ring apparatus 1a is coupled to the access line La, and the port B2 of the ring apparatus 1b is coupled to the access line Lb. The ports A2 and B2 are set so that the access lines La and Lb configure an MC-LAG for the access apparatus 92. In an initial state, the access line La is set as an active line, and the access line Lb is set as a standby line.

The port A3 of the ring apparatus 1a is coupled to oppose the port B3 of the ring apparatus 1b through a control line Lf. The ports A3 and B3 transmit and receive a control signal Sc concerning the access lines La and Lb through the control line Lf. The control signal Sc includes, for example, a fault notification for switching the access lines La and Lb from a standby line to an active line.

The ports A1 and A4 of the ring apparatus 1a and the ports B1 and B4 of the ring apparatus 1b are coupled to the ring line Lr. The port A1 and the port B1 are intercoupled so as to oppose each other through the ring line Lr. The ports A1, A4, B1, and B4 transmit and receive, through the ring line Lr, a main signal Sg including data transmitted by the terminal apparatuses 90 and 91.

The port C2 of the ring apparatus 1c is coupled to the access line Lc, and the port D2 of the ring apparatus 1d is coupled to the access line Ld. The ports C2 and D2 are set so that the access lines Lc and Ld configure the MC-LAG for the access apparatus 93. In the initial state, the access line Lc is set as an active line, and the access line Ld is set as a standby line. The pair of ring apparatuses 1a and 1b and the pair of ring apparatuses 1c and 1d are examples of the communication system. In the following example, however, operations of the pair of ring apparatuses 1a and 1b are described.

The port C3 of the ring apparatus 1c is coupled to oppose the port D3 of the ring apparatus 1d through a control line Le. As is the case with the ports A3 and B3 and the ports C3 and D3 transmit and receive a control signal concerning the access lines Lc and Ld through the control line Le.

The ports C1 and C4 of the ring apparatus 1c and the ports D1 and D4 of the ring apparatus 1d are coupled to the ring line Lr. The port C4 is coupled to oppose the port B4 through the ring line Lr, and the port D4 is coupled to oppose the port A4 through the ring line Lr. The port C1 and the port D1 are intercoupled so as to oppose each other through the ring line Lr. The ports C1, C4, D1, and D4 transmit and receive, through the ring line Lr, the main signal including data transmitted by the terminal apparatuses 90 and 91.

The terminal apparatuses 90 and 91 communicate with each other, for example, through a path R. The path R runs through the access lines La and Lc and through the ring line Lr between the ring apparatuses 1a, 1b, and 1c. A path between the port D1 of the ring apparatus 1d and the port C1 of the ring apparatus 1c is set as a blocking point BP in order to suppress the main signal from continuously looping through the ring line Lr. Therefore, the ports C1 and D1 may not be able to transmit and receive the main signal.

Configurations of the communication apparatuses 1a to 1d will now be described. The following example deals with the communication apparatus 1a. However, the other communication apparatuses 1b to 1d have configuration similar to that of the communication apparatus 1a.

Figure 2:
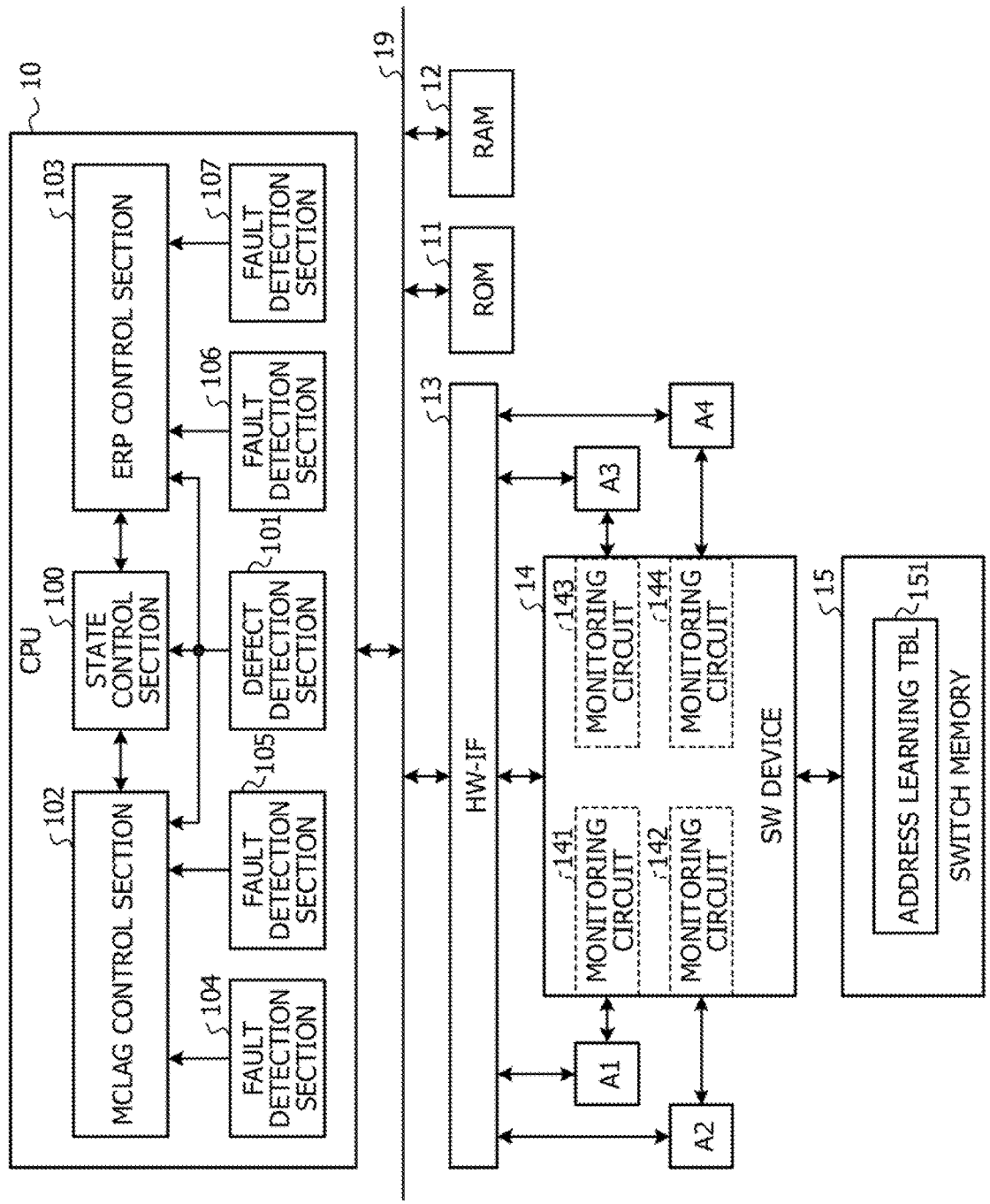
FIG. 2 is a configuration diagram illustrating an example of a communication apparatus.

FIG. 2 is a configuration diagram illustrating an example of the communication apparatus 1a. The communication apparatus 1a includes a central processing unit (CPU) 10, a read only memory (ROM) 11, a random access memory (RAM) 12, a hardware interface section (HW-IF) 13, a switch (SW) device 14, a switch memory 15, and ports A1 to A4. The CPU 10 is coupled to the ROM 11, the RAM 12, and the HW-IF 13 through a bus 19 so that signals may be inputted and outputted between them.

The ROM 11 stores programs that drive the CPU 10. The programs include, for example, software for executing a communication control method according to the embodiment. The RAM 12 functions as a working memory for the CPU 10.

The HW-IF 13 processes the communication between the CPU 10, the switch device 14, and the ports A1 to A4. The HW-IF 13 is a circuit including hardware such as a field programmable gate array (FPGA) or an application specified integrated circuit (ASIC).

The ports A1 to A4 are, for example, LAN ports, and each include an optical transceiver (not illustrated) for transmitting and receiving an Ethernet signal. The Ethernet signal includes, in addition to the main signal Sg, monitoring control data concerning the path switchover of the main signal Sg for ERP.

The port A1, which is an example of a first port, is coupled to the port B1 of the communication apparatus 1b through the ring line Lr. The communication apparatus 1b is an example of a first communication apparatus.

The port A2, which is an example of a second port, is coupled to the access apparatus 92 through the access line La. As mentioned earlier, the access line La is configured redundantly with the access line Lb between the access apparatus 92 and the ring apparatus 1b. The access apparatus 92 is an example of a second communication apparatus disposed external to the ring line Lr, and the access lines La and Lb are an example of a second access line and an example of a first access line, respectively. The port B2 of the ring apparatus 1b is an example of an access port that is coupled to the access apparatus 92 through the access line Lb.

The port A3, which is an example of a third port, is coupled to the port B3 of the ring apparatus 1b through the control line Lf. The control line Lf is configured, for example, as an IPL. Therefore, the main signal Sg does not flow through the control line Lf, and only the control signal Sc flows through the control line Lf.

The port A4, which is an example of a fourth port, is coupled to the port D4 of the ring apparatus 1d through the ring line Lr. When the path R of the main signal Sg runs through the ports A4 and D4 and ports A4 and D4 transmit and receive the main signal Sg through the ring line Lr. The communication apparatus 1d is an example of a third communication apparatus.

The switch device 14 is coupled to the ports A1 to A4. The switch device 14 includes monitoring circuits 141 to 144 that monitor the communication state of each of the ports A1 to A4. For example, the monitoring circuits 141 to 144 output an alarm upon detection of a bit error rate of the communication along the access line La and the ring line Lr or upon detection of an interrupted optical input or output.

The switch device 14 also mediates the exchange of main signal Sg between the ports A1, A2, and A4. When the main signal Sg is transferred along the route R illustrated in FIG. 1, the switch device 14 transfers the main signal Sg between the ports A1 and A2. The switch device 14 is a circuit including hardware such as an FPGA or an ASIC.

The switch device 14 is coupled to the switch memory 15 that stores an address learning table (TBL) 151. The switch device 14 learns the address of an Ethernet signal from the main signal Sg and stores the learned address in the address learning table 151. For example, the destination address of the main signal Sg transferred from the ports A1, A2, and A4 is registered in the address learning table 151.

The switch device 14 transfers the main signal Sg between the ports A1, A2, and A4 in accordance with the address learning table 151. When the CPU 10 uses an ERP function to issue an instruction for switching the path R, the switch device 14 initializes the contents of the address learning table 151 and relearns addresses.

The switch device 14 transmits and receives the control signal Sc through the port A3. The switch device 14 outputs the received control signal Sc to the CPU 10 through the HW-IF 13. Meanwhile, the control signal Sc to be transmitted is inputted from the CPU 10 to the switch device 14 through the HW-IF 13.

Upon reading a program from the ROM 11, the CPU 10 forms, as functions, a state control section 100, a defect detection section 101, an MCLAG control section 102, an ERP control section 103, and fault detection sections 104 to 107.

The fault detection section 104, which is an example of a first detection section, detects a fault in the control line Lf by collecting alarms from the monitoring circuit 143. The fault detection section 104 detects a fault in the control line Lf when, for example, the control signal Sc is asynchronous with respect to the redundant partner ring apparatus 1b. The fault in the control line Lf may be, for example, a break in the optical fiber of the control line Lr or a defect of the port A3 or B3.

The fault detection section 105, which is an example of a second detection section, detects a fault in the access line La by collecting alarms from the monitoring circuit 142. The fault in the access line La may be, for example, a break in the optical fiber of the access line La or a defect of the port A4. The fault detection section 105 of the ring apparatus 1b is an example of a third detection section that detects a fault in the access line Lb.

The defect detection section 101 detects a defect in the ring apparatus 1a. The defect detection section 101 detects a defect when, for example, a periodic inspection signal from a monitoring target circuit is discontinued.

The fault detection section 106, which is an example of a ring fault detection section, detects a fault in the ring line Lr toward the port A1 by collecting alarms from the monitoring circuit 141. The fault in the ring line Lr toward the port A1 may be, for example, a break in the optical fiber between the ports A1 and B1 or a defect of the port A1 etc.

The fault detection section 107 detects a fault in the ring line Lr toward the port A4 by collecting alarms from the monitoring circuit 144. The fault in the ring line Lr toward the port A4 may be, for example, a break in the optical fiber between the ports A4 and D4 or a defect of the port A4 etc.

The state control section 100 coordinates with the MCLAG control section 102 and the ERP control section 103 to control the state of the ring apparatus 1a in accordance with given conditions. The state control section 100 controls the ports A1 to A4 in accordance with the state of the ring apparatus 1a.

Based on the results of detection by the fault detection sections 104 and 105 and the defect detection section 101, the MCLAG control section 102 provides redundant system switching control of the access lines La and Lb redundantly configured by MC-LAG. When no fault is detected in the control line Lf by the fault detection section 104, the MCLAG control section 102 communicates with the ring apparatus 1b through the control line Lf.

For example, when no fault is detected in the control line Lf, the MCLAG control section 102 generates, depending on the detection of a fault in the access line La by the fault detection section 105, the control signal Sc including a fault notification concerning the fault in the access line La, and outputs the generated control signal Sc to the switch device 14 through the HW-IF 13. Consequently, the fault notification concerning the fault in the access line La is transmitted from the port A3 to the redundant partner ring apparatus 1b through the control line Lf.

The port B3 of the ring apparatus 1b receives signals on the control line Lf, including a fault notification. The switch device 14 outputs a fault notification inputted from the port B3 to the CPU 10 through the HW-IF 13. Based on the fault notification, the MCLAG control section 102 of the ring apparatus 1b switches the access line Lb from a standby line to an active line. In this instance, the MCLAG control section 102 exercises control to switch the port B2 of the access line Lb from a non-communicative state to a communicative state. The MCLAG control section 102 of the ring apparatus 1b is an example of a second switching section.

As described above, the MCLAG control section 102 of the ring apparatus 1a transmits, to the ring apparatus 1b at a neighboring node through the control line Lf, the control signal Sc for switching the access line Lb from a standby line to an active line. Therefore, in the path R of the main signal Sg, the faulty access line La is replaced by the nonfaulty access line Lb. Consequently, the main signal Sg is communicated continuously even after the occurrence of a fault. The MCLAG control section 102 is an example of a switching section and of a first switching section.

Without regard to the presence of a fault in the control line Lf, the MCLAG control section 102 of the ring apparatus 1a switches the access line La from an active line to a standby line in accordance with the detection of a fault in the access line La by the fault detection section 105. In this instance, the MCLAG control section 102 exercises control to switch the port A2 of the access line La from a communicative state to a non-communicative state.

As described above, when a fault occurs in the access line La, the ring apparatus 1a switches from an active system to a standby system.

However, if a fault occurs in the access line La while the control line Lf is faulty, the ring apparatus 1a may not be able to transmit a fault notification to the redundant partner ring apparatus 1b through the control line Lf.

Accordingly, while a fault in the control line Lf is detected, the state control section 100 shuts down the port A1 in accordance with the detection of a fault in the access line La. The state control section 100 exercises control to switch the port A1 from a communicative state to a non-communicative state, for example, through the HW-IF 13. This causes the port A1 to stop the transmission and reception of the main signal Sg.

In the redundant partner ring apparatus 1b, the monitoring circuit 141 detects the shutdown of the port A1 when, for example, an optical input from the port A1 is discontinued. The fault detection section 106 acquires an alarm indicative of the shutdown from the monitoring circuit 141, and notifies the ERP control section 103 of the shutdown. The monitoring circuit 141 is an example of a fourth detection section that detects a shutdown.

When no fault is detected in the access line Lb by the fault detection section 105 while a fault in the control line Lf is detected, the state control section 100 of the ring apparatus 1b coordinates with the ERP control section 103 to switch the access line Lb from a standby line to an active line in accordance with the detection of a shutdown of the port A1. This enables the access apparatus 92 to communicate with the ring apparatus 1b through the access line Lb instead of the faulty access line La.

Consequently, even if a fault occurs in a case where the transmission of the control signal Sc to the redundant partner ring apparatus 1b is unachievable, the ring apparatus 1a is able to maintain communication. The state control section 100 is an example of a control section that shuts down the port A1.

The MCLAG control section 102 switches the access line La from an active line to a standby line even in a case where a defect is detected by the defect detection section 101. In this instance, the state control section 100 shuts down all the ports A1 to A4 so that the transmission of the main signal Sg and control signal Sc in a defect state does not allow the defect to affect the other ring apparatuses 1a to 1d and access apparatus 92. The MCLAG control section 102 of the ring apparatus 1b switches the access line Lb from a standby line to an active line in accordance with the detection of a shutdown of the port A1.

Consequently, even when a defect occurs in one ring apparatus 1a, the other ring apparatus 1b is able to maintain communication. However, if a defect occurs while the control line Lf is faulty, the ring apparatus 1a may not be able to transmit the control signal Sc to the redundant partner ring apparatus 1b.

Accordingly, the state control section 100 of the ring apparatus 1a shuts down all the ports A1 to A4 in accordance with the detection of a defect by the defect detection section 101. In this instance, the state control section 100 exercises control to switch the ports A1 to A4 from a communicative state to a non-communicative state through the HW-IF 13.

Consequently, the MCLAG control section 102 of the partner ring apparatus 1b switches the access line Lb from a standby line to an active line in accordance with the detection of a shutdown of the port A1. Therefore, even when a defect occurs, one redundant ring apparatus 1a is able to let the other ring apparatus 1b maintain communication.

The ring apparatus 1a shuts down all the ports A1 to A4. This suppresses a defect from affecting the access apparatus 92 and the other ring apparatuses 1b to 1d when, for example, an abnormal main signal Sg or control signal Sc generated due to the defect is transmitted.

The ERP control section 103 controls the communication of the main signal Sg through the ring line Lr in accordance with the results of detection by the fault detection sections 106 and 107 and the defect detection section 101. The ERP control section 103 switches the path R of the main signal Sg in accordance with the detection of a fault in the ring line Lr by the fault detection sections 106 and 107. The ERP control section 103 sets the blocking point BP in accordance with the switched path R. Therefore, the communication within the ring line Lr is maintained even if a fault occurs in the ring line Lr between the ring apparatuses 1a and 1b or between the ring apparatuses 1a and 1c.

If there is no fault in at least either one of the ring line Lr between the ring apparatus 1a and the ring apparatus 1b and the ring line Lr between the ring apparatus 1a and the communication apparatus 1d in a case where neither a fault in the access line La nor a defect in the ring apparatus 1a is detected, the MCLAG control section 102 maintains the access line Lc as an active line.

The main signal Sg does not flow through the control line Lf. Therefore, even while the control line Lf is faulty, the ring apparatus 1a is able to maintain the communication of the main signal Sg from at least either one of the ports A1 and A4 through the ring line Lr as far as no fault occurs in the access line La and no defect occurs in the ring apparatus 1a. Consequently, the MCLAG control section 102 does not switch the access line La from an active line to a standby line, and thus saves the time required for such switching.

Exemplary operations performed in the event of a fault or a defect in the ring apparatus 1a will now be described. The following exemplary operations are described on the assumption that the initial state of the communication system is as illustrated in FIG. 1.

(In the Event of a Fault in the Control Line Lf)

Figure 3:
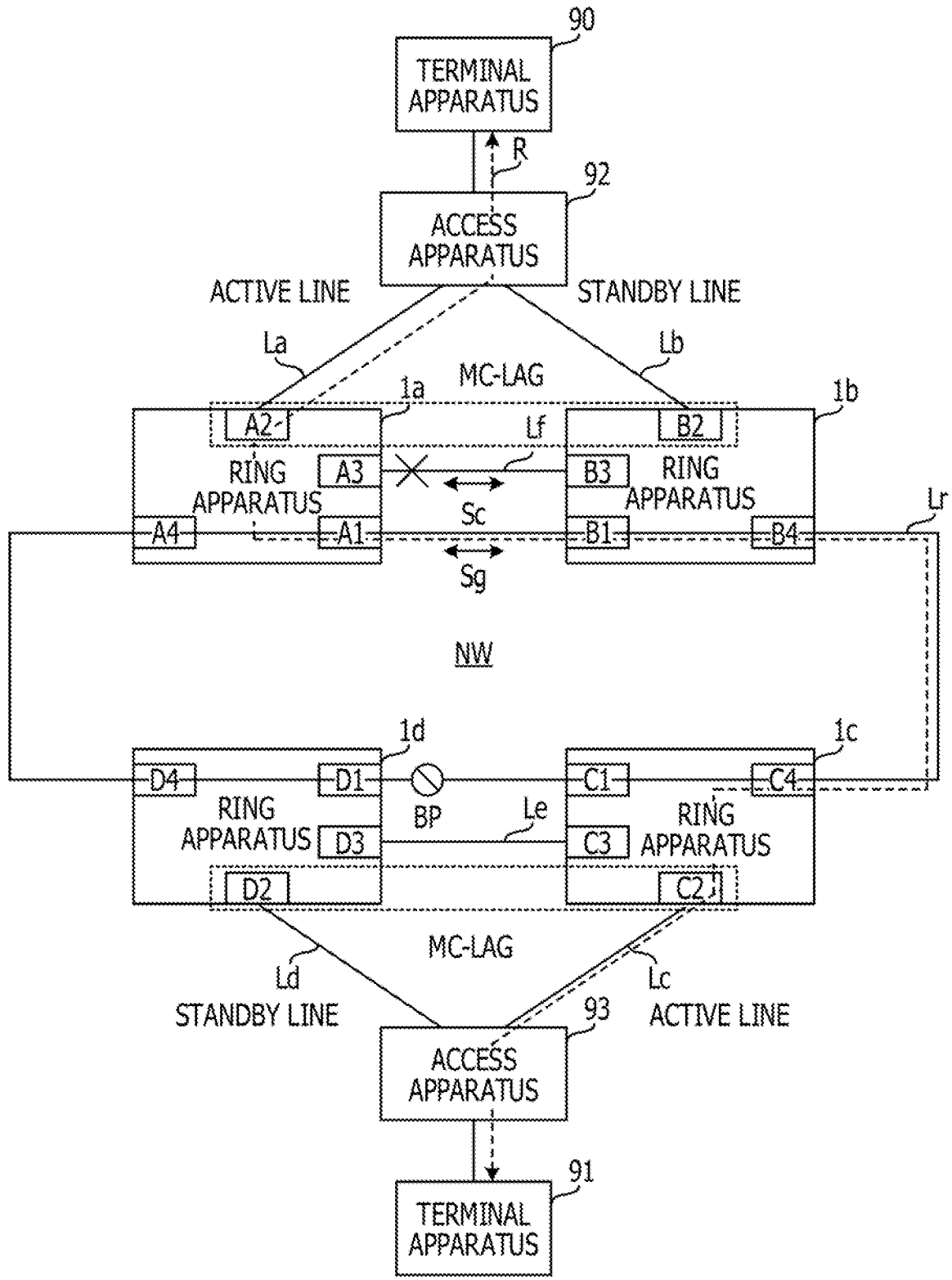
FIG. 3 is a diagram illustrating an exemplary operation that is performed by a communication system when a fault occurs in a control line.

FIG. 3 is a diagram illustrating an exemplary operation that is performed by the communication system when a fault occurs in the control line Lf. Elements common to FIGS. 1 and 3 are designated by the same reference symbols and will not be redundantly described.

A cross mark (x) indicates an exemplary location of a fault. The same applies to the subsequent exemplary operations. In the present example, a fault has occurred in the control line Lf, but no fault has occurred in the access line La and in the ring line Lr, and no defect has occurred in the ring apparatus 1a.

Accordingly, the MCLAG control section 102 of the ring apparatus 1a maintains the access line La as an active line. This saves the time required for switching the access line La to a standby line. Even when a fault occurs in the control line Lf, the ring apparatuses 1a and 1b stop the transmission and reception of the control signal Sc without setting a path of the control signal Sc for the ring line Lr in such a manner as to bypass the fault. This suppresses the fault in the control line Lf from affecting the main signal Sg in the ring line Lr.

(In the Event of a Fault in the Ring Line Lr)

Figure 4:
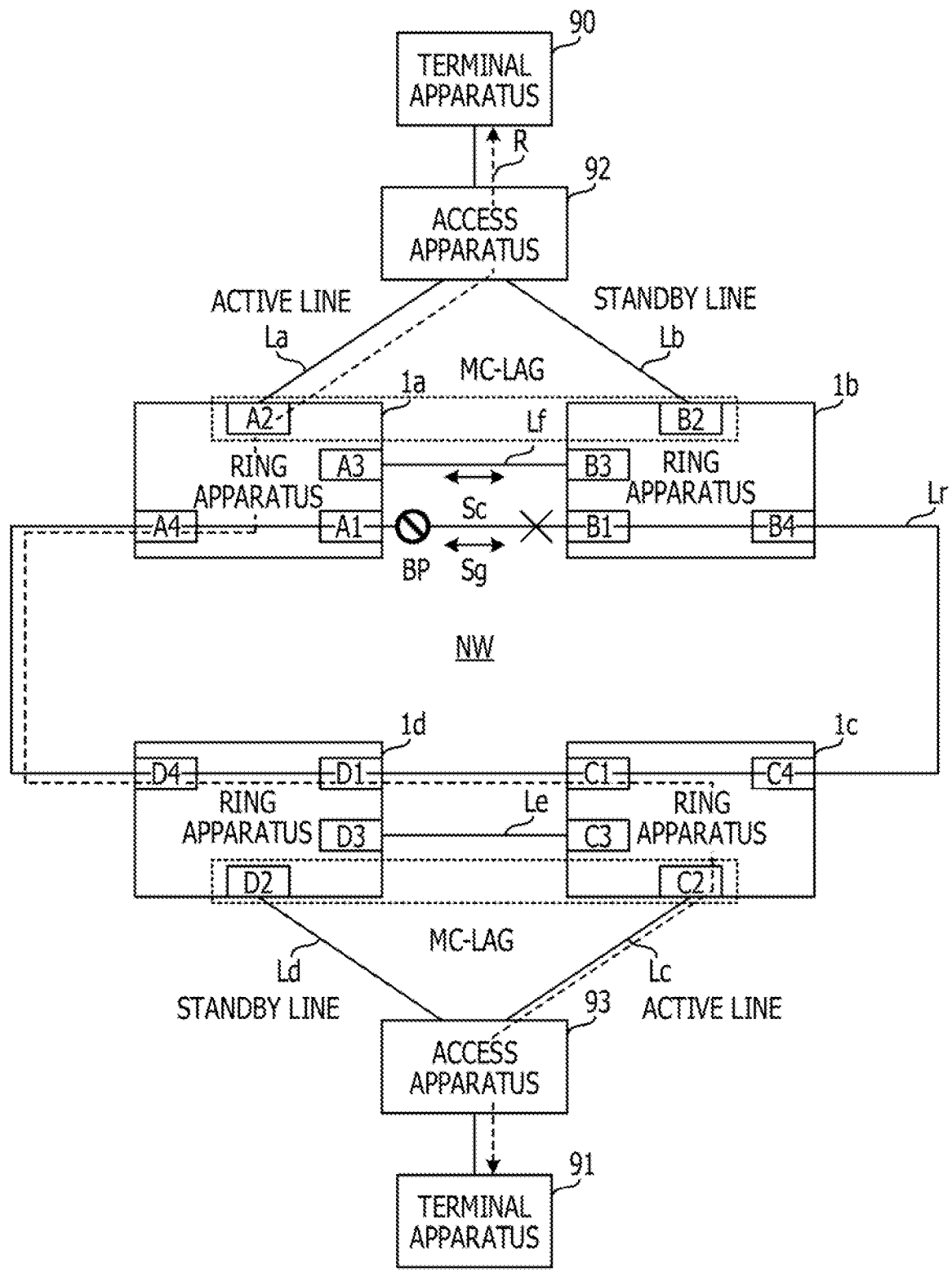
FIG. 4 is a diagram illustrating an exemplary operation that is performed by a communication system when a fault occurs in a ring line.

FIG. 4 is a diagram illustrating an exemplary operation that is performed by the communication system when a fault occurs in the ring line Lr. Elements common to FIGS. 1 and 4 are designated by the same reference symbols and will not be redundantly described.

In the present example, a fault has occurred in the ring line Lr between the ports A1 and B1, but no fault has occurred in the access line La and in the ring line Lr between the ports A4 and D4, and no defect has occurred in the ring apparatus 1a. Accordingly, the MCLAG control section 102 of the ring apparatus 1a maintains the access line La as an active line.

When the fault detection section 106 detects a fault in the above-mentioned section of the ring line Lr, the ERP control section 103 of the ring apparatuses 1a and 1b notifies each of the other ring apparatuses 1d and 1c of the detected fault through the ports A4 and B4. The ERP control section 103 of the respective ring apparatuses 1a to 1d switches the path R so as to bypass the fault. In this instance, the ERP control section 103 of the respective ring apparatuses 1a to 1d sets the blocking point BP In a section where the fault of the ring line Lr has occurred. Therefore, the switched path R runs through the access apparatuses 92 and 93 and the ring apparatuses 1a and 1c.

As described above, since no fault has occurred in the ring line Lr between the ports A4 and D4, the ring apparatus 1a is able to continuously communicate the main signal Sg by setting the path R running through such a nonfaulty section of the ring line Lr without switching the access line La to a standby line. This suppresses the fault in the ring line Lr from affecting the control line Lf.

(In the Event of a Fault in the Access Line La)

Figure 5:
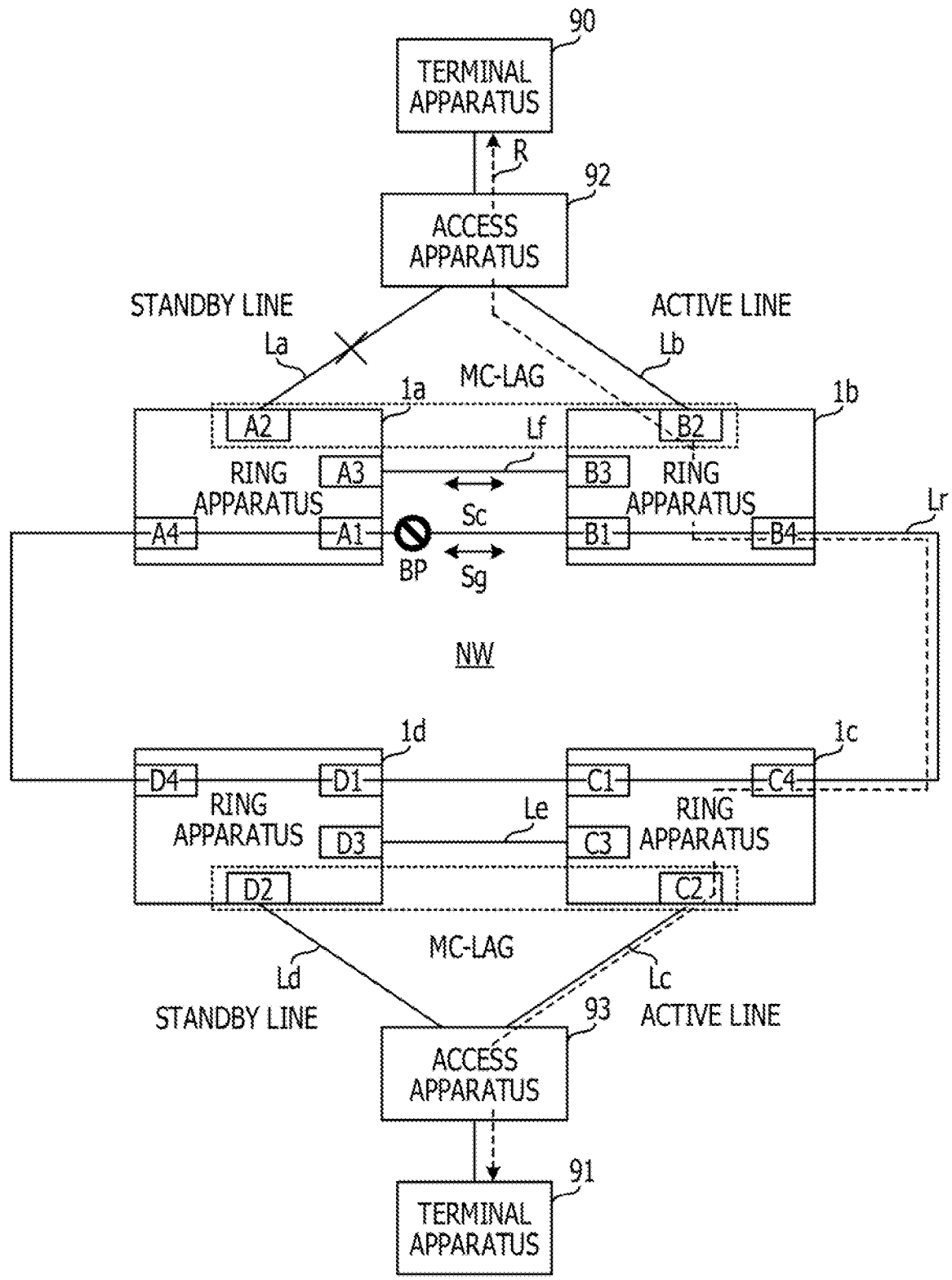
FIG. 5 is a diagram illustrating an exemplary operation that is performed by a communication system when a fault occurs in an access line.

FIG. 5 is a diagram illustrating an exemplary operation that is performed by the communication system when a fault occurs in the access line La. Elements common to FIGS. 1 and 5 are designated by the same reference symbols and will not be redundantly described.

In the present example, a fault has occurred in the access line La toward the ring apparatus 1a, but no fault has occurred in the control line Lf, and no defect has occurred in the ring apparatus 1a.

Accordingly, the MCLAG control section 102 of the ring apparatus 1a switches the access line La from an active line to a standby line, and transmits a fault notification concerning the fault in the access line La to the redundant partner ring apparatus 1b through the control line Lf. In response to the fault notification, the MCLAG control section 102 of the ring apparatus 1b switches the access line Lb from a standby line to an active line.

The ERP control section 103 of the ring apparatuses 1a and 1b coordinates with the MCLAG control section 102 to switch the path R of the main signal Sg in accordance with the redundant system switching of the access lines La and Lb. Consequently, the communication of the main signal Sg is maintained even after the occurrence of the fault in the access line La.

(In the Event of a Fault in the Access Line La and in the Control Line Lf)

Figure 6:
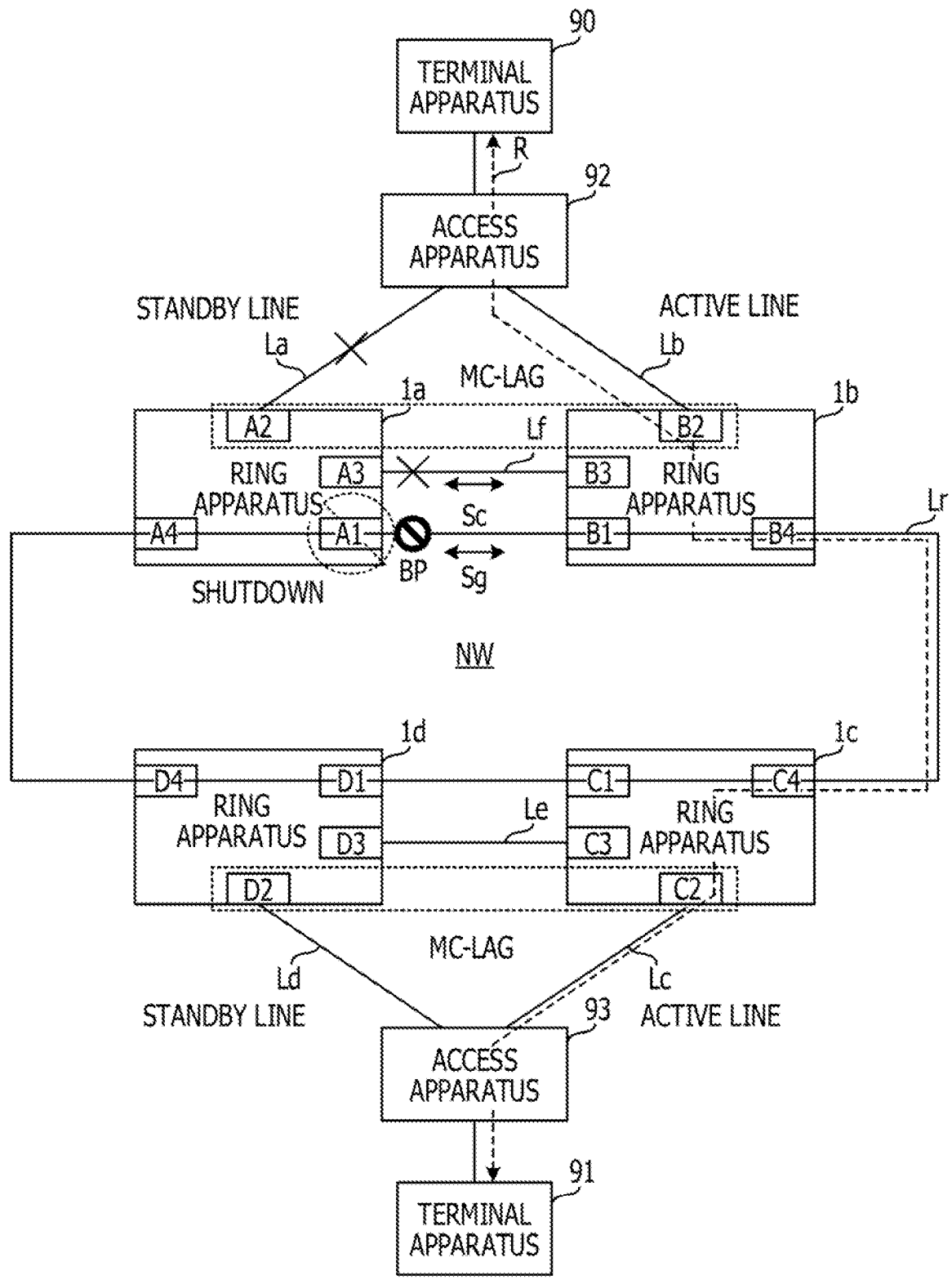
FIG. 6 is a diagram illustrating an exemplary operation that is performed by a communication system when each fault occurs in an access line and in a control line.

FIG. 6 is a diagram illustrating an exemplary operation that is performed by the communication system when a fault occurs in the access line La and in the control line Lf. Elements common to FIGS. 1 and 6 are designated by the same reference symbols and will not be redundantly described.

The present example deals with a case where a fault has occurred in the access line La in a state Illustrated in FIG. 3. In accordance with the detection of a fault in the access line La, the MCLAG control section 102 of the ring apparatus 1a switches the access line La from an active line to a standby line. However, due to a fault in the control line Lf, the ring apparatus 1a may not be able to transmit, to the redundant partner ring apparatus 1b, the control signal Sc including a fault notification concerning the fault in the access line La.

Accordingly, while the fault in the control line Lf is detected, the state control section 100 of the ring apparatus 1a shuts down the port A1 in accordance with the detection of the fault in the access line La.

When no fault is detected in the access line Lb by the fault detection section 105 while the fault in the control line Lf is detected, the MCLAG control section 102 of the redundant partner ring apparatus 1b switches the access line Lb from a standby line to an active line in accordance with the detection of the shutdown of the port A1. For example, the MCLAG control section 102 switches the access line Lb from a standby line to an active line when the ring apparatus 1b is not the cause of the shutdown.

Accordingly, even when the transmission of the control signal Sc to the redundant partner ring apparatus 1b is unachievable, the ring apparatus 1a is able to issue a fault notification due to the shutdown of the port A1. This enables the ring apparatus 1b to maintain communication. In the present example, the ERP control section 103 of each of the ring apparatuses 1a and 1b switches the blocking point BP and the path R of the main signal Sg, as is the case with the exemplary operation illustrated in FIG. 5.

As regards the ring apparatuses 1a and 1b, the active system and the standby system interchange due to the above operation. This suppresses both of the ring apparatuses 1a and 1b from becoming active. Consequently, this suppresses the occurrence of a loop in the main signal Sg transmitted through the access apparatus 92 and the ring apparatuses 1a and 1b.

(In the Event of a Fault in the Control Line Lf and a Defect in the Ring Apparatus 1a)

Figure 7:
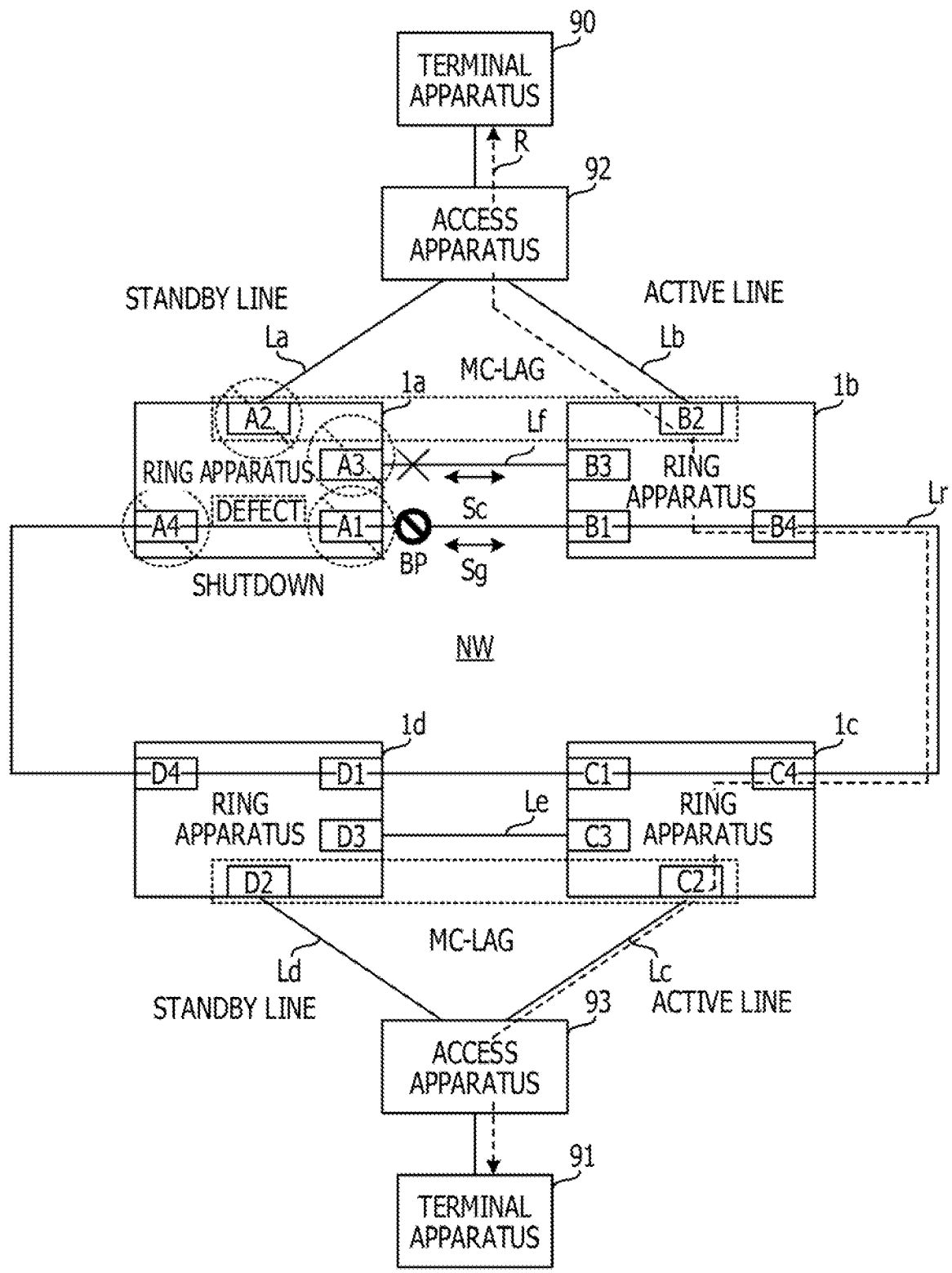
FIG. 7 is a diagram illustrating an exemplary operation that is performed by a communication system in an event of a fault in a control line and a defect in a ring apparatus.

FIG. 7 is a diagram illustrating an exemplary operation that is performed by the communication system when a fault occurs in the control line Lf and a defect occurs in the ring apparatus 1a. Elements common to FIGS. 1 and 7 are designated by the same reference symbols and will not be redundantly described.

The present example deals with a case where a defect has occurred in the ring apparatus 1a in a state Illustrated in FIG. 3. Due to a local defect in addition to a fault in the control line Lf, the ring apparatus 1a may not be able to notify the redundant partner ring apparatus 1b of the defect.

The state control section 100 of the ring apparatus 1*a* shuts down the ports A1 to A4 in accordance with the detection of the defect. The redundant partner ring apparatus 1*b* switches the access line Lb from a standby line to an active line in accordance with the detection of the shutdown of the port A1, as is the case with the foregoing exemplary operation, and is thus able to maintain communication.

The ring apparatus 1*a* shuts down all the ports A1 to A4. Therefore, the transmission of an abnormal main signal Sg and control signal Sc, which may be generated due to a defect, is suppressed. This suppresses a defect in the ring apparatus 1*a* from affecting the other ring apparatuses 1*b* to 1*d*.

(Processing in the CPU 10)

The processing performed by the CPU 10 will now be described.

Figure 8:
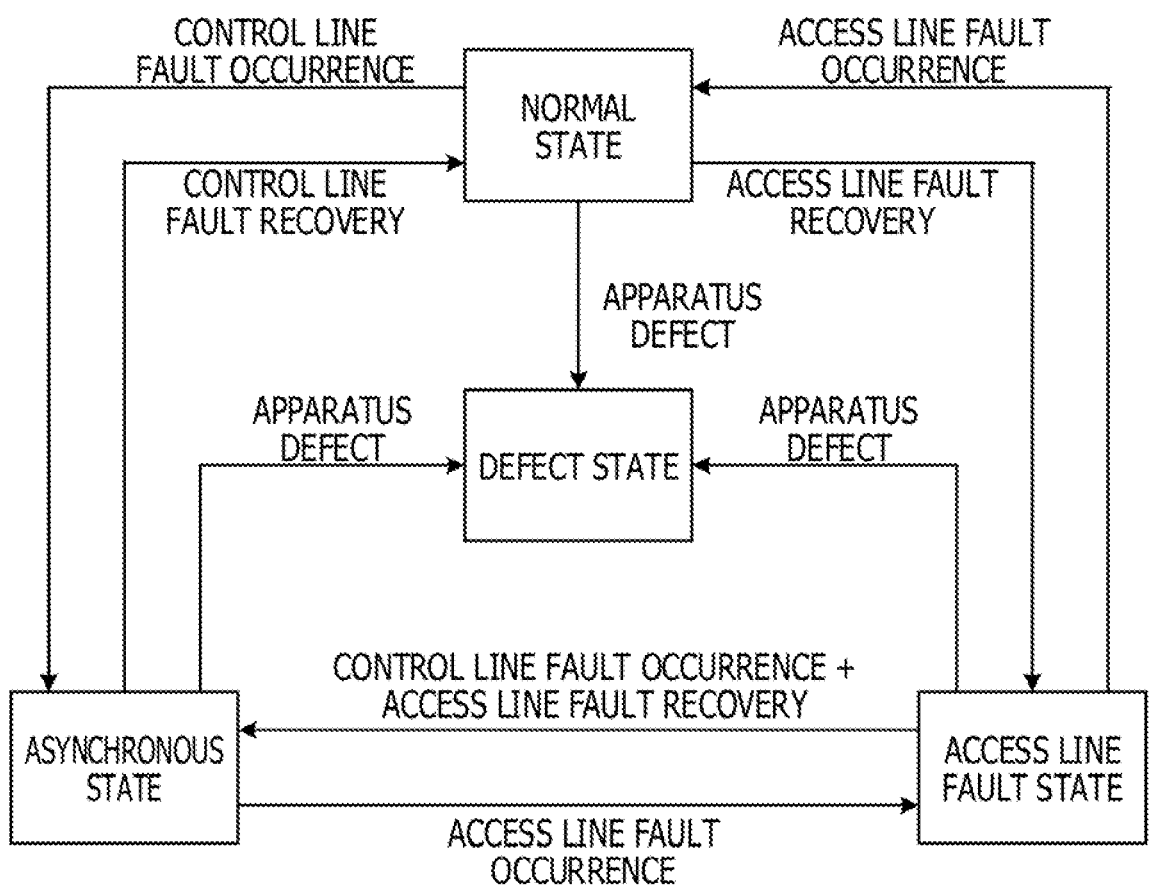
FIG. 8 is a state transition diagram illustrating exemplary states of a ring apparatus managed by a state control section.

FIG. 8 is a state transition diagram illustrating exemplary states of the ring apparatuses 1*a* to 1*d* managed by the state control section 100. Defined states of the ring apparatuses 1*a* to 1*d* are, for example, a normal state, an asynchronous state, an access line fault state, and a defect state. Arrows connecting the individual states are marked with events indicative of transition conditions.

The normal state is a regular state where neither a fault nor a defect has occurred in the ring apparatuses 1*a* to 1*d*. The asynchronous state is a state where the control signal Sc is not synchronized between the ring apparatuses 1*a* and 1*b* or between the ring apparatuses 1*c* and 1*d* due to a fault in the control lines Lf and Le.

The access line fault state is a state where the access lines La to Ld are faulty. The defect state is a state where the ring apparatuses 1*a* to 1*d* are defective.

In the normal state, the state control section 100 transitions the ring apparatuses 1*a* to 1*d* into the asynchronous state in accordance with the occurrence of a fault in the control lines Lf and Le (see "CONTROL LINE FAULT OCCURRENCE"). Meanwhile, in the asynchronous state, the state control section 100 transitions the ring apparatuses 1*a* to 1*d* into the regular state in accordance with the fault recovery of the control lines Lf and Le (see "CONTROL LINE FAULT RECOVERY").

In the normal state, the state control section 100 transitions the ring apparatuses 1*a* to 1*d* into the access line fault state in accordance with the occurrence of a fault in the access lines La to Ld (see "ACCESS LINE FAULT OCCURRENCE"). Meanwhile, in the access line fault state, the state control section 100 transitions the ring apparatuses 1*a* to 1*d* into the regular state in accordance with the fault recovery of the access lines La to Ld (see "ACCESS LINE FAULT RECOVERY").

In the asynchronous state, the state control section 100 transitions the ring apparatuses 1*a* to 1*d* into the access line fault state in accordance with the occurrence of a fault in the access lines La to Ld (see "ACCESS LINE FAULT OCCURRENCE"). Meanwhile, in the access line fault state, the state control section 100 transitions the ring apparatuses 1*a* to 1*d* into the asynchronous state in accordance with the occurrence of a fault in the control lines Lf and Le (see "CONTROL LINE FAULT OCCURRENCE") and with the fault recovery of the access lines La to Ld (see "ACCESS LINE FAULT RECOVERY").

In the normal state, in the access line fault state, and in the asynchronous state, the state control section 100 transitions the ring apparatuses 1*a* to 1*d* into an apparatus defect state in accordance with the detection of a defect in the ring apparatuses 1*a* to 1*d*. The ring apparatuses 1*a* to 1*d* do not achieve recovery from a defect. Therefore, when the ring apparatuses 1*a* to 1*d* transition into the apparatus defect state, the state control section 100 stops controlling state transitions. In this instance, defective ring apparatuses 1*a* to 1*d* are replaced by new ring apparatuses.

Figure 9:
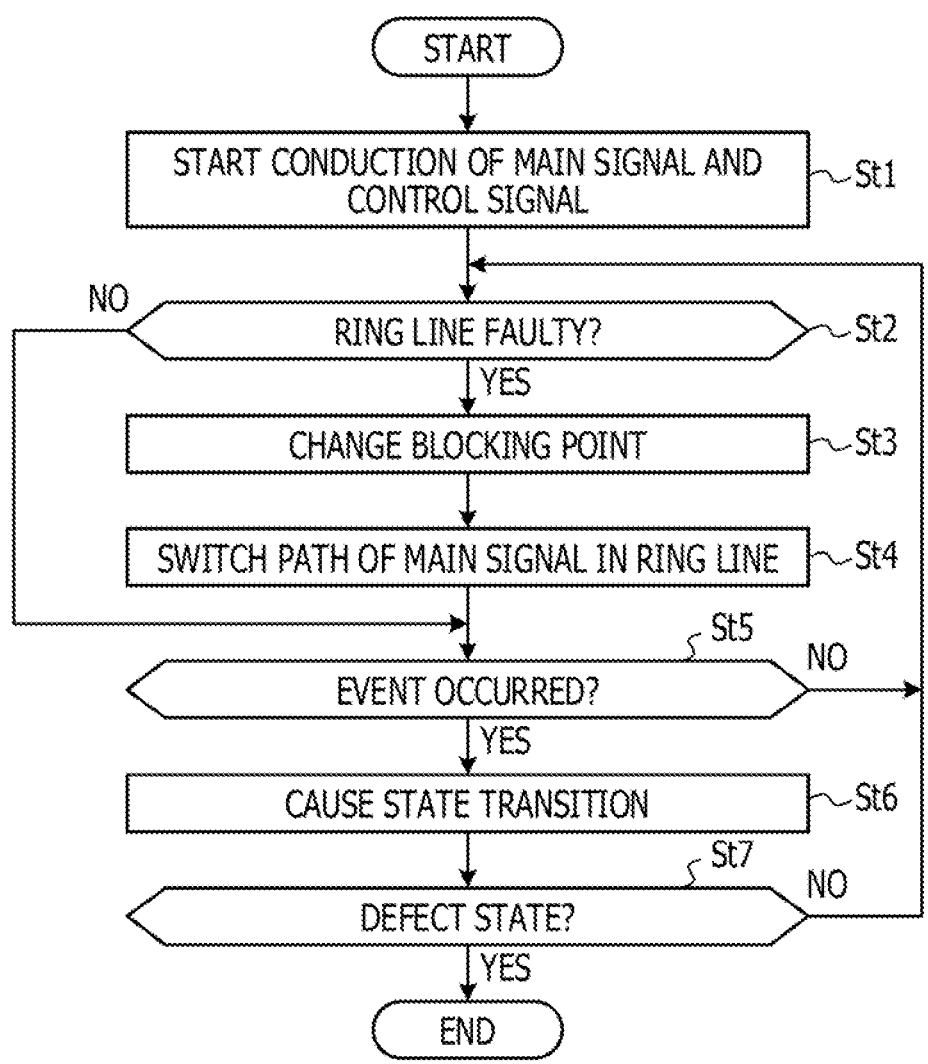
FIG. 9 is a flowchart illustrating an example of a state control process performed on a ring apparatus.

FIG. 9 is a flowchart illustrating an example of a state control process performed on the ring apparatuses 1*a* to 1*d*. The ERP control section 103 and the MCLAG control section 102 start conducting the main signal Sg and the control signal Sc, respectively (step St1). In this instance, the ERP control section 103 and the MCLAG control section 102 perform various setups, for example, on the ports A1 to A4 and the switch device 14.

Next, the ERP control section 103 causes the fault detection sections 106 and 107 to determine whether or not a fault is detected in the ring line Lr (step St2). If no fault is detected in the ring line Lr ("NO" at step St2), later-described steps St5 and beyond are performed.

If a fault is detected in the ring line Lr ("YES" at step St2), the ERP control section 103 changes the blocking point BP in the ring line Lr (step St3). In this instance, the ERP control section 103 exercises control to place the ports A1 to A4, B1 to B4, C1 to C4, and D1 to D4 corresponding to the blocking point BP in a non-communicative state.

Next, the ERP control section 103 switches the path R of the main signal Sg in the ring line Lr (step St4). In this instance, the ERP control section 103 initializes the address learning table 151 and then causes the switch device 14 to learn addresses.

Next, the state control section 100 checks the results of fault and defect detection by the fault detection sections 104 and 105 and the defect detection section 101 in order to determine whether or not an event indicative of a state transition condition has occurred (step St5). If the event has not occurred ("NO" at step St5), steps St2 and beyond are performed again.

If the event has occurred ("YES" at step St5), the state control section 100 transitions the states of the ring apparatuses 1*a* to 1*d* in accordance with the event as illustrated in FIG. 8 (step St6). Next, the state control section 100 determines whether or not the ring apparatuses 1*a* to 1*d* are in the defect state (step St7).

If the ring apparatuses 1*a* to 1*d* are not in the defect state ("NO" at step St7), steps St2 and beyond are performed again. If the ring apparatuses 1*a* to 1*d* are in the defect state ("YES" at step St7), the state control process terminates. The state control process is performed in the above-described manner.

Figure 10:
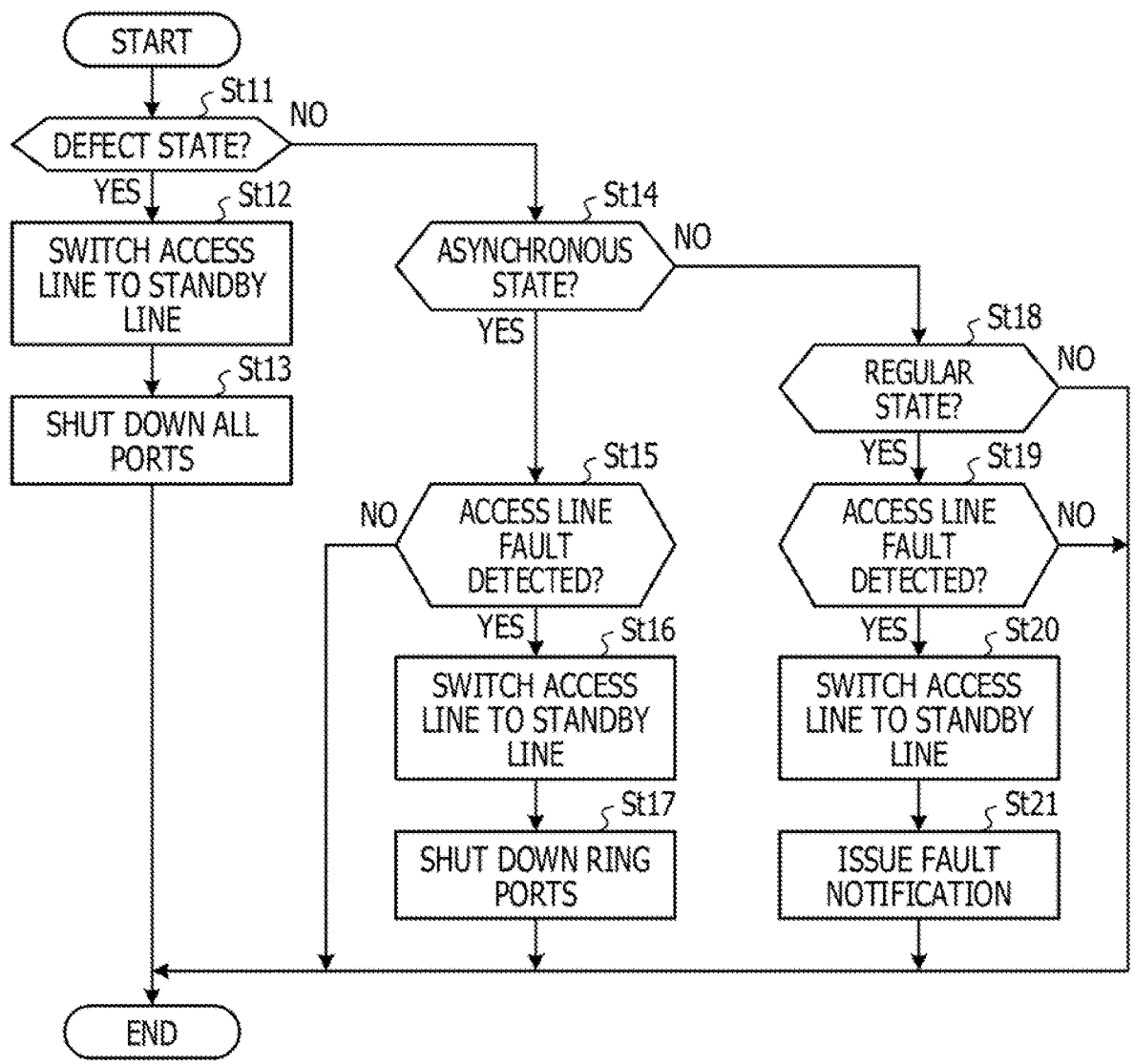
FIG. 10 is a flowchart illustrating an example of a process that is performed in accordance with a state of a ring apparatus of an active system.

FIG. 10 is a flowchart illustrating an example of a process that is performed in accordance with the states of the ring apparatuses 1*a* and 1*c* of the active system. The process is repeatedly performed in parallel with the state control process performed on the ring apparatuses 1*a* and 1*c* of the active system.

The state control section 100 determines whether or not the ring apparatuses 1*a* and 1*c* are in the defect state (step St11). If the ring apparatuses 1*a* and 1*c* are in the defect state ("YES" at step St11), the MCLAG control section 102 switches the access lines La and Lc from an active line to a standby line in accordance with an instruction from the state control section 100 (step St12). Next, the state control section 100 shuts down all the ports A1 to A4 and C1 to C4 (step St13).

As described above, the MCLAG control section 102 switches the access lines La and Lc from an active line to a standby line in accordance with the detection of a defect, and the state control section 100 shuts down the ports A1 to A4 and C1 to C4 in accordance with the detection of a defect.

This permits the ring apparatuses 1a and 1b to switch the access lines Lb and Ld of the redundant partner ring apparatuses 1b and 1d from a standby line to an active line, and suppresses the defect from affecting the other ring apparatuses 1a to 1d and access apparatuses 92 and 93.

Meanwhile, if the ring apparatuses 1a and 1c are not in the defect state ("NO" at step St11), the state control section 100 determines whether or not the ring apparatuses 1a and 1c are in the asynchronous state (step St14). If the ring apparatuses 1a and 1c are in the asynchronous state ("YES" at step St14), the state control section 100 causes the fault detection section 105 to determine whether or not a fault is detected in the access lines La and Lc (step St15).

If a fault is detected in the access lines La and Lc ("YES" at step St15), the MCLAG control section 102 switches the access lines La and Lc from an active line to a standby line in accordance with an instruction from the state control section 100 (step St16). Next, the state control section 100 shuts down the ports A1 and C1 of the ring line Lr (step St17). Meanwhile, if no fault is detected in the access lines La and Lc ("NO" at step St15), the process terminates.

As described above, the MCLAG control section 102 switches the access lines La and Lc from an active line to a standby line in accordance with the detection of a fault in the access lines La and Lc, and the state control section 100 shuts down the port A1 in accordance with the detection of a fault in the access lines La and Lc while a fault in the control line Lf is detected. This permits the ring apparatuses 1a and 1b to switch the access lines Lb and Ld of the redundant partner ring apparatuses 1b and 1d from a standby line to an active line.

Meanwhile, if the ring apparatuses 1a and 1c are not in the asynchronous state ("NO" at step St14), the state control section 100 determines whether or not the ring apparatuses 1a and 1c are in the regular state (step St18). If the ring apparatuses 1a and 1c are not in the regular state ("NO" at step St18), the process terminates. If the ring apparatuses 1a and 1c are in the regular state ("YES" at step St18), the state control section 100 causes the fault detection section 105 to determine whether or not a fault is detected in the access lines La and Lc (step St19).

If a fault is detected in the access lines La and Lc ("YES" at step St19), the MCLAG control section 102 switches the access lines La and Lc from an active line to a standby line in accordance with an instruction from the state control section 100 (step St20). Next, the state control section 100 transmits a fault notification concerning a fault in the access lines La and Lc to the redundant partner ring apparatuses 1b and 1d (step St21). Meanwhile, if no fault is detected in the access lines La and Lc ("NO" at step St19), the process terminates.

As described above, when no fault is detected in the control lines Lf and Le, the MCLAG control section 102 transmits a fault notification to the ring apparatuses 1b and 1d of the standby system through the control lines Lf and Le in accordance with the detection of a fault in the access lines La and Lc. This permits the ring apparatuses 1a and 1b to switch the access lines Lb and Ld of the redundant partner ring apparatuses 1b and 1d from a standby line to an active line. In the above-described manner, the ring apparatuses 1a and 1c of the active system perform the process in accordance with the current state.

Figure 11:
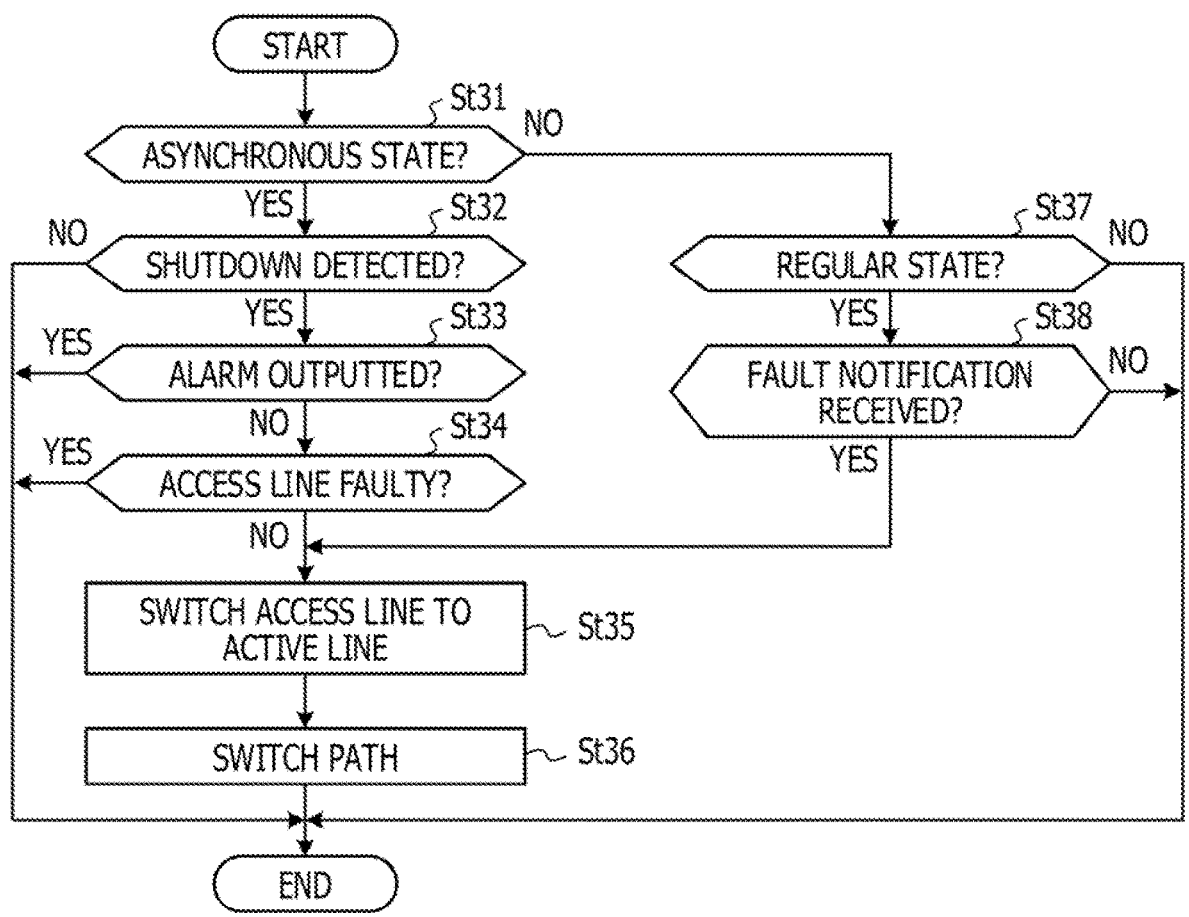
FIG. 11 is a flowchart illustrating an example of a process that is performed in accordance with a state of a ring apparatus of a standby system.

FIG. 11 is a flowchart illustrating an example of a process that is performed in accordance with the state of the ring apparatuses 1b and 1d of the standby system. The process is repeatedly performed in parallel with the state control process performed on the ring apparatuses 1b and 1d of the standby system.

The state control section 100 determines whether or not the ring apparatuses 1b and 1d are in the asynchronous state (step St31). If the ring apparatuses 1b and 1d are in the asynchronous state ("YES" at step St31), the state control section 100 determines whether or not the shutdown of the ports A1 and C1 of the redundant partner ring apparatuses 1a and 1c is detected by the monitoring circuit 141 (step St32). The monitoring circuit 141 detects the shutdown when, for example, an optical input from the ports A1 and C1 is discontinued.

If the shutdown is not detected ("NO" at step St32), the process terminates. Meanwhile, if the shutdown is detected ("YES" at step St32), the state control section 100 determines whether or not the monitoring circuits 141 to 144 have outputted an alarm that may cause the shutdown (step St33). If the alarm is outputted ("YES" at step St33), the process terminates.

If the alarm that may cause the shutdown is not outputted ("NO" at step St33), the MCLAG control section 102 determines whether or not a fault is detected in the access lines Lb and Ld by the fault detection section 105 (step St34). If a fault is detected in the access lines Lb and Ld ("YES" at step St34), the process terminates.

If no fault is detected in the access lines Lb and Ld ("NO" at step St34), the MCLAG control section 102 switches the access lines Lb and Ld from a standby line to an active line (step St35). Next, the ERP control section 103 switches the path R of the main signal Sg so that the path R runs through the access lines Lb and Ld (step St36). Upon completion of step St36, the process terminates.

As described above, when no fault is detected in the access lines La and Lc while a fault in the control lines Lf and Le is detected, the MCLAG control section 102 switches the access lines Lb and Ld from a standby line to an active line in accordance with the detection of the shutdown of the ports A1 and C1 of the redundant partner ring apparatuses 1a and 1c. Therefore, the ring apparatuses 1b and 1d are able to maintain the communication of the main signal Sg.

Meanwhile, if the ring apparatuses 1b and 1d are not in the asynchronous state ("NO" at step St31), the state control section 100 determines whether or not the ring apparatuses 1b and 1d are in the regular state (step St37). If the ring apparatuses 1b and 1d are not in the regular state ("NO" at step St37), the process terminates.

If the ring apparatuses 1b and 1d are in the regular state ("YES" at step St37), the MCLAG control section 102 determines whether or not a fault notification concerning a fault in the access lines La and Lc is received from the redundant partner ring apparatuses 1a and 1c (step St38). If the fault notification is not received ("NO" at step St38), the process terminates. Meanwhile, if the fault notification is received ("YES" at step St38), steps St35 and St36 are performed. Upon completion of steps St35 and St36, the process terminates. In the above-described manner, the ring apparatuses 1b and 1d of the standby system perform the process in accordance with the current state.

Figure 12:
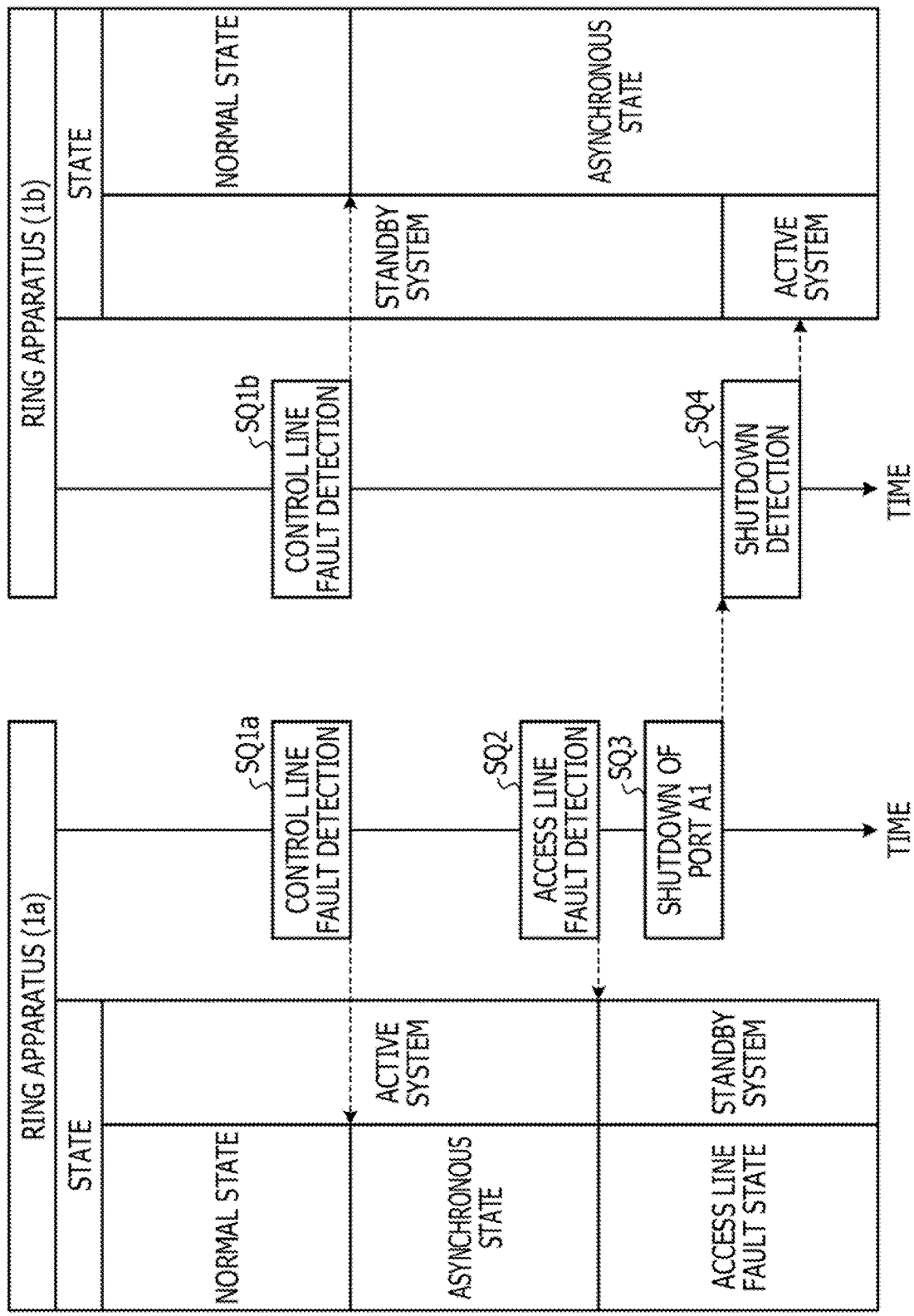
FIG. 12 is a sequence diagram illustrating exemplary operations that are performed by redundantly paired ring apparatuses when a fault in an access line is detected while a fault in a control line is detected.

FIG. 12 is a sequence diagram Illustrating exemplary operations that are performed by redundantly paired ring apparatuses 1a and 1b when a fault in the access line La is detected while a fault in the control line Lf is detected. The present example deals with the operations performed by the pair of ring apparatuses 1a and 1b. However, the other pair of ring apparatuses 1c and 1d performs similar operations as the pair of ring apparatuses 1a and 1b. At the beginning of a sequence illustrated in FIG. 12, the ring apparatuses 1a and 1b are both in the normal state, the ring apparatus 1a operates as an active system, and the ring apparatus 1b operates as a standby system.

Upon detecting a fault in the control line Lf (symbol SQ1a), the ring apparatus 1a of the active system switches from the normal state to the asynchronous state. Upon detecting a fault in the control line Lf (symbol SQ1b), the ring apparatus 1b of the standby system switches from the normal state to the asynchronous state.

Subsequently, upon detecting a fault in the access line La in the asynchronous state (symbol SQ2), the ring apparatus 1a of the active system shuts down the port A1 (symbol SQ3). The ring apparatus 1a then switches from the active system to the standby system, and transitions into the access line fault state.

Upon detecting the shutdown of the port A1 in the asynchronous state (symbol SQ4), the ring apparatus 1b of the standby system switches from the standby system to the active system. As described above, when the port A1 shuts down in a case where a fault in the access line La is detected while a fault in the control line Lf is detected, the ring apparatuses 1a and 1b switch between the active system and the standby system.

Figure 13:
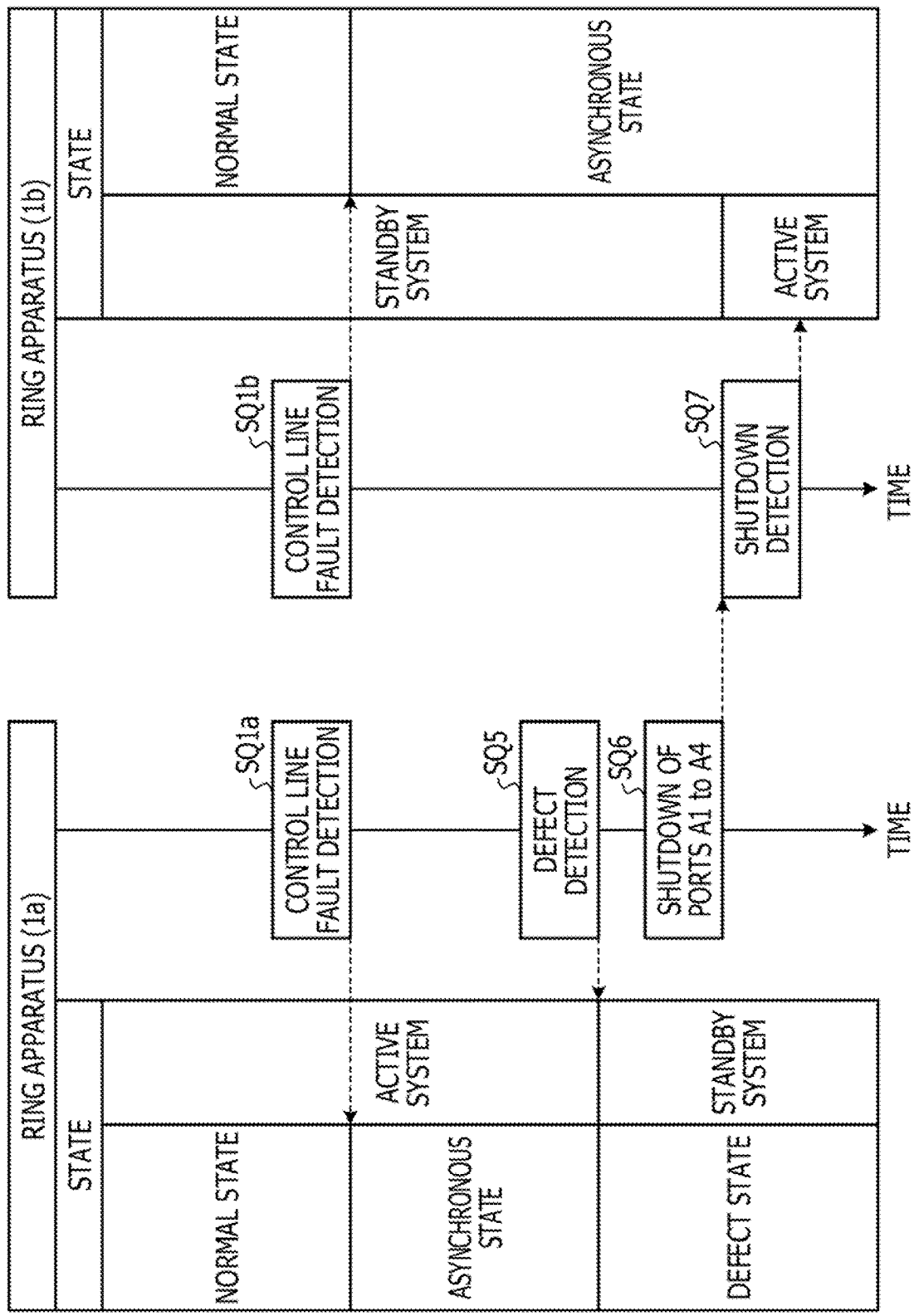
FIG. 13 is a sequence diagram illustrating exemplary operations that are performed by redundantly paired ring apparatuses when a defect is detected while a fault in a control line is detected.

FIG. 13 is a sequence diagram illustrating exemplary operations that are performed by redundantly paired ring apparatuses 1a and 1b when a defect is detected while a fault in the control line Lf is detected. Operations common to FIGS. 12 and 13 are designated by the same reference symbols and will not be redundantly described.

The present example deals with the operations performed by the pair of ring apparatuses 1a and 1b. However, the other pair of ring apparatuses 1c and 1d performs similar operations as the pair of ring apparatuses 1a and 1b. At the beginning of a sequence Illustrated in FIG. 13, the ring apparatuses 1a and 1b are both in the normal state, the ring apparatus 1a operates as an active system, and the ring apparatus 1b operates as a standby system.

Upon detecting a defect (symbol SQ5), the ring apparatus 1a of the active system switches to the ring apparatus of the standby system and transitions into the defect state. The ring apparatus 1a then shuts down the ports A1 to A4 (symbol SQ6).

Upon detecting the shutdown of the port A1 in the asynchronous state (symbol SQ7), the ring apparatus 1b of the standby system switches from the standby system to the active system. As described above, when the port A1 shuts down in a case where a fault is detected while a fault in the control line Lf is detected, the ring apparatuses 1a and 1b switch between the active system and the standby system.

(Communication System in which the Ring Line Lr Between the Ring Apparatuses 1a and 1b is Duplexed)

In the above-described communication system, the ports A1 and B1 of the ring apparatuses 1a and 1b are coupled by the control line Lf through which only the control signal Sc flows. However, the communication system is not limited to such a configuration. For example, the ports A1 and B1 of the ring apparatuses 1a and 1b may be coupled by two ring lines through which both the main signal Sg and the control signal Sc flow.

Figure 14:
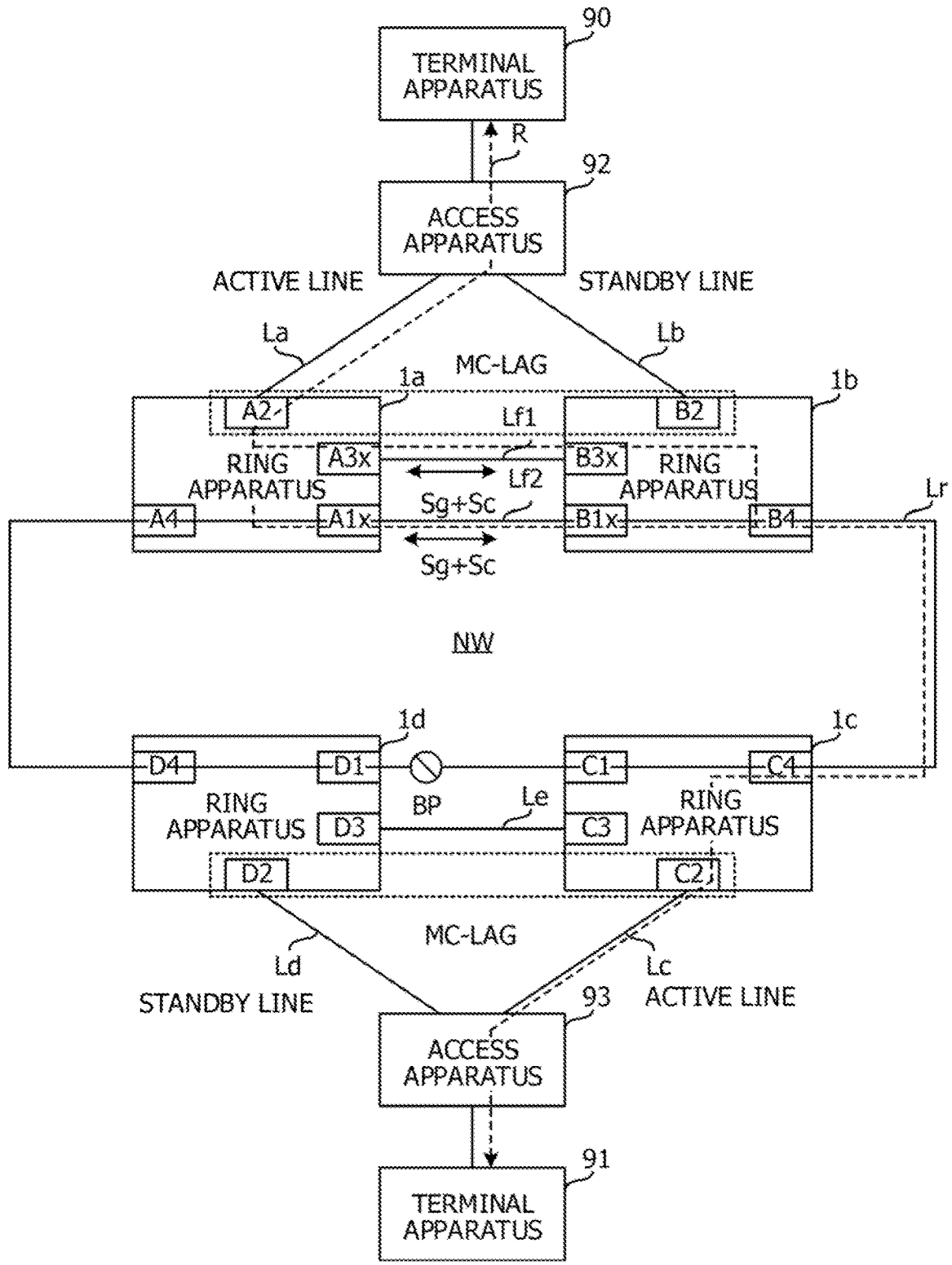
FIG. 14 is a configuration diagram illustrating an example of a communication system in which a ring line between ring apparatuses is duplexed.

FIG. 14 is a configuration diagram illustrating an example of the communication system in which the ring line Lr between the ring apparatuses 1a and 1b is duplexed. Elements common to FIGS. 1 and 14 are designated by the same reference symbols and will not be redundantly described. The present example deals with a configuration where only ring lines Lf1 and Lf2 between one pair of ring apparatuses 1a and 1b are duplexed. However, the configuration is not limited to such duplexing. The other pair of ring apparatuses 1c and 1d may also be duplexed in similar manner.

The ring apparatus 1a includes ports A1x, A2, A3x, and A4, and the ring apparatus 1b includes ports B1x, B2, B3x, and B4. The ports A3x and B3x are intercoupled so as to oppose each other through the ring line Lf1. The ports A1x and B1x are intercoupled so as to oppose each other through the ring line Lf2. The ring line Lf1 is an example of a control line.

The main signal Sg and the control signal Sc both flow through the ring lines Lf1 and Lf2 while they are not faulty. The ports A3x and B3x mutually transmit and receive the main signal Sg and the control signal Sc through the ring line Lf1. The ports A1x and B1x mutually transmit and receive the main signal Sg and the control signal Sc through the ring line Lf2.

Consequently, the path R of the main signal Sg between the ring apparatuses 1a and 1b runs through the two ring lines Lf1 and Lf2. The ports A3x and B3x and the ports A1x and B1x are synchronized respectively by the control signal Sc transmitted and received through the ring lines Lf1 and Lf2.

Figure 15:
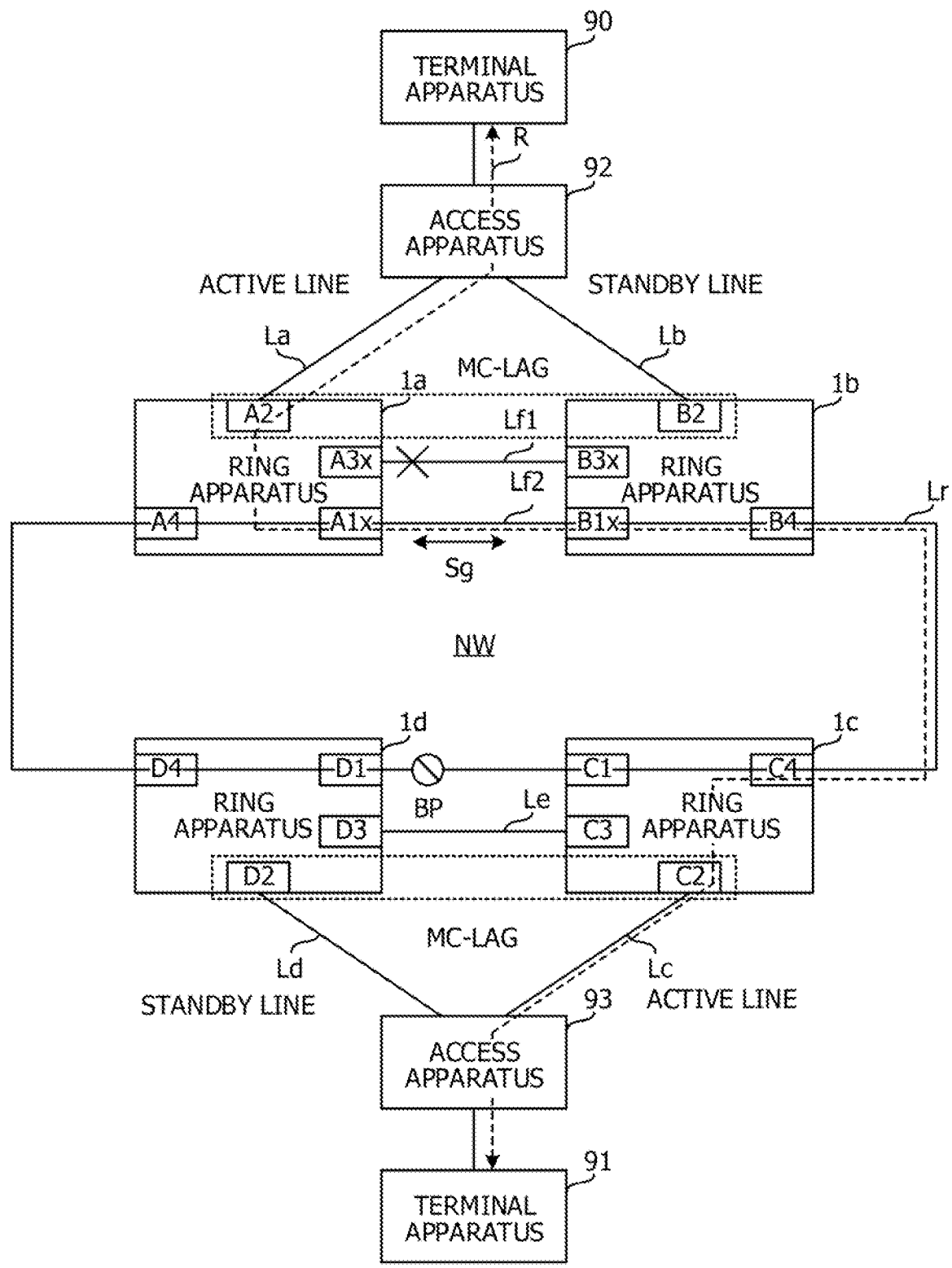
FIG. 15 is a diagram illustrating an exemplary operation that is performed by a communication system when a fault occurs in one ring line.

FIG. 15 is a diagram illustrating an exemplary operation that is performed by the communication system when a fault occurs in one ring line Lf1. Elements common to FIGS. 14 and 15 are designated by the same reference symbols and will not be redundantly described.

Upon detecting a fault in one ring line Lf1, the ring apparatuses 1a and 1b stops the transmission and reception of the control signal Sc through the other ring line Lf2. Therefore, the bandwidth of the main signal Sg flowing through the ring line Lf2 may be increased by an amount equivalent to the bandwidth of the control signal Sc.

Although not illustrated, when a fault in the ring line Lf2 is detected conversely to the present example, the transmission and reception of the control signal Sc through the ring line Lf1 comes to a stop. Therefore, the bandwidth of the main signal Sg flowing through the ring line Lf1 may be increased by an amount equivalent to the bandwidth of the control signal Sc.

When a fault is detected in only one of the ring lines Lf1 and Lf2, the ring apparatuses 1a and 1b maintain the access lines La and Lb as an active line and a standby line, respectively. This eliminates the necessity of performing a switching process on the access lines La and Lb.

Figure 16:
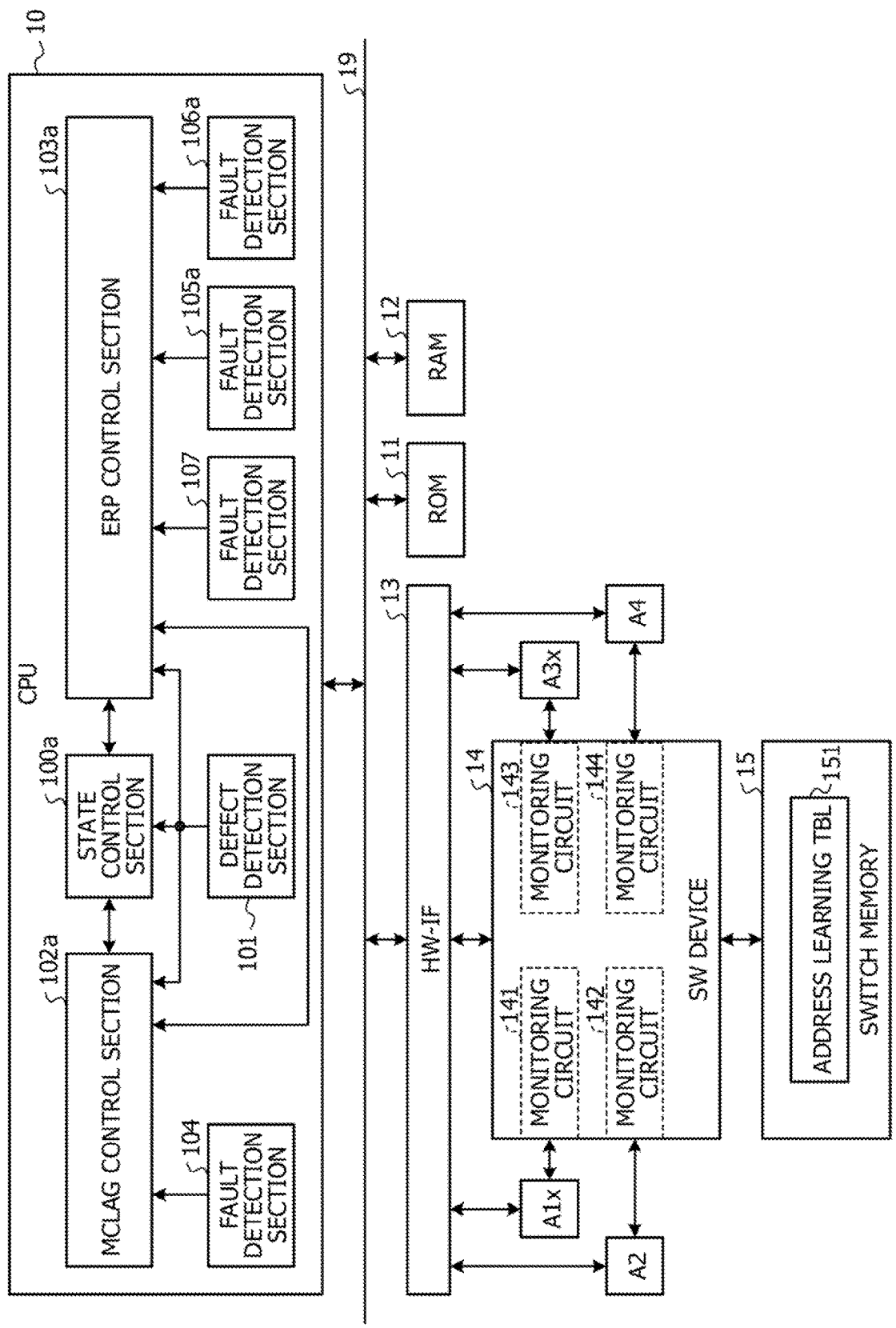
FIG. 16 is a configuration diagram illustrating another example of a ring apparatus.

FIG. 16 is a configuration diagram illustrating another example of the ring apparatus 1a. Elements common to FIGS. 2 and 16 are designated by the same reference symbols and will not be redundantly described. The ring apparatus 1b includes the ports B1x, B2, B3x, and B4 instead of the ports A1x, A2, A3x, and A4. However, the other elements of the ring apparatus 1b are similar to those of the ring apparatus 1a.

The port A1x transmits and receives the main signal Sg and the control signal Sc to and from the ring apparatus 1b through the ring line Lf2. The port A3x transmits and receives the main signal Sg and the control signal Sc to and from the ring apparatus 1b through the ring line Lf1.

Upon reading a program from the ROM 11, the CPU 10 forms, as functions, fault detection sections 105a and 106a in place of the fault detection sections 105 and 106, and a state control section 100a, an MCLAG control section 102a, and an ERP control section 103a in place of the state control section 100, the MCLAG control section 102, and the ERP control section 103, respectively. The fault detection section 105a detects a fault in the ring line Lf1, and the fault detection section 106a detects a fault in the ring line Lf2.

The ERP control section 103a controls the communication of the main signal Sg through the ring lines Lf1 and Lf2 in accordance with the results of detection by the fault detection sections 105a and 106a and the defect detection section 101. The ERP control section 103a outputs the results of detection by the fault detection sections 105a and 106a to the MCLAG control section 102a.

The MCLAG control section 102a controls the communication of the control signal Sc in accordance with the results of detection by the fault detection sections 104, 105a, and 106a. As is the case with the MCLAG control section 102 in the foregoing example, the MCLAG control section 102a switches the access lines La and Lb to an active line or a standby line.

The state control section 100a is an example of the control section. In addition to the function of the state control section 100 in the foregoing example, the state control section 100a coordinates with the MCLAG control section 102a and the ERP control section 103a to control the bandwidths of the main signal Sg and control signal Sc, which are to be transmitted and received through the ports A1x and A3x. The state control section 100a causes the port A3x to stop the transmission and reception of the control signal Sc through the ring line Lf1 in accordance with the detection of a fault in the ring line Lf2 by the fault detection section 106a, and causes the port A1x to stop the transmission and reception of the control signal Sc through the ring line Lf2 in accordance with the detection of a fault in the ring line Lf1 by the fault detection section 105a. In this instance, the state control section 100a instructs, for example, the switch device 14 and the MCLAG control section 102a to stop the transfer and generation of the control signal Sc.

In accordance with the detection of a fault in the ring line Lf2 by the fault detection section 106a, the state control section 100a increases the bandwidth of the main signal Sg to be transmitted and received by the port A3x through the ring line Lf1. In accordance with the detection of a fault in the ring line Lf1 by the fault detection section 105a, the state control section 100a increases the bandwidth of the main signal Sg to be transmitted and received by the port A3x through the ring line Lf1. The state control section 100a instructs, for example, the switch device 14 and the ERP control section 103a to increase the transfer bandwidth of the main signal Sg.

As described above, when a fault is detected in one of the ring lines Lf1 and Lf2, the state control section 100a is able to increase the bandwidth allocatable to the main signal Sg by stopping the transmission and reception of the control signal Sc through the other ring line Lf1 or Lf2. This suppresses a decrease in the main signal Sg between the ring apparatuses 1a and 1b.

Figure 17:
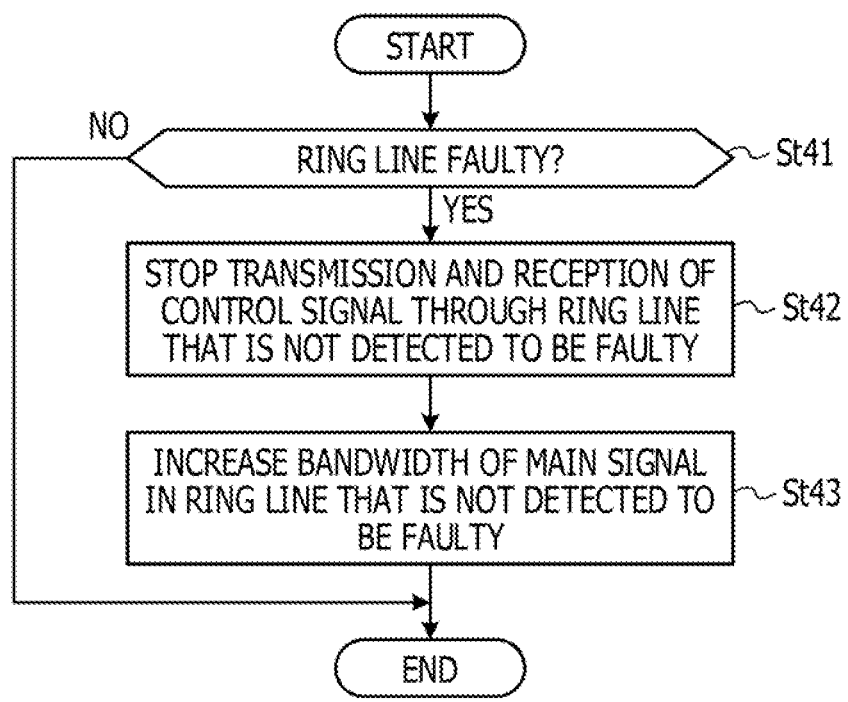
FIG. 17 is a flowchart illustrating an example of a control process performed on a main signal and a control signal.

FIG. 17 is a flowchart illustrating an example of a control process performed on the main signal Sg and the control signal Sc. The state control section 100a repeatedly performs the control process in parallel with the processes illustrated in FIGS. 9 to 11.

The state control section 100a determines whether or not a fault is detected in either the ring line Lf1 or the ring line Lf2 (step St41). If neither the ring line Lf1 nor the ring line Lf2 is detected to be faulty ("NO" at step St41), the state control section 100a terminates the control process.

Meanwhile, if either the ring line Lf1 or the ring line Lf2 is detected to be faulty ("YES" at step St41), the state control section 100a causes the associated port A1x or A3x to stop the transmission and reception of the control signal Sc through the ring line Lf1 or Lf2 that is not detected to be faulty (step St42). Next, the state control section 100a increases the bandwidth of the main signal Sg transmitted and received through the ring line Lf1 or Lf2 that is not detected to be faulty (step St43), and then terminates the control process. In the above-described manner, the control process is performed on the main signal Sg and the control signal Sc.

Figure 18:
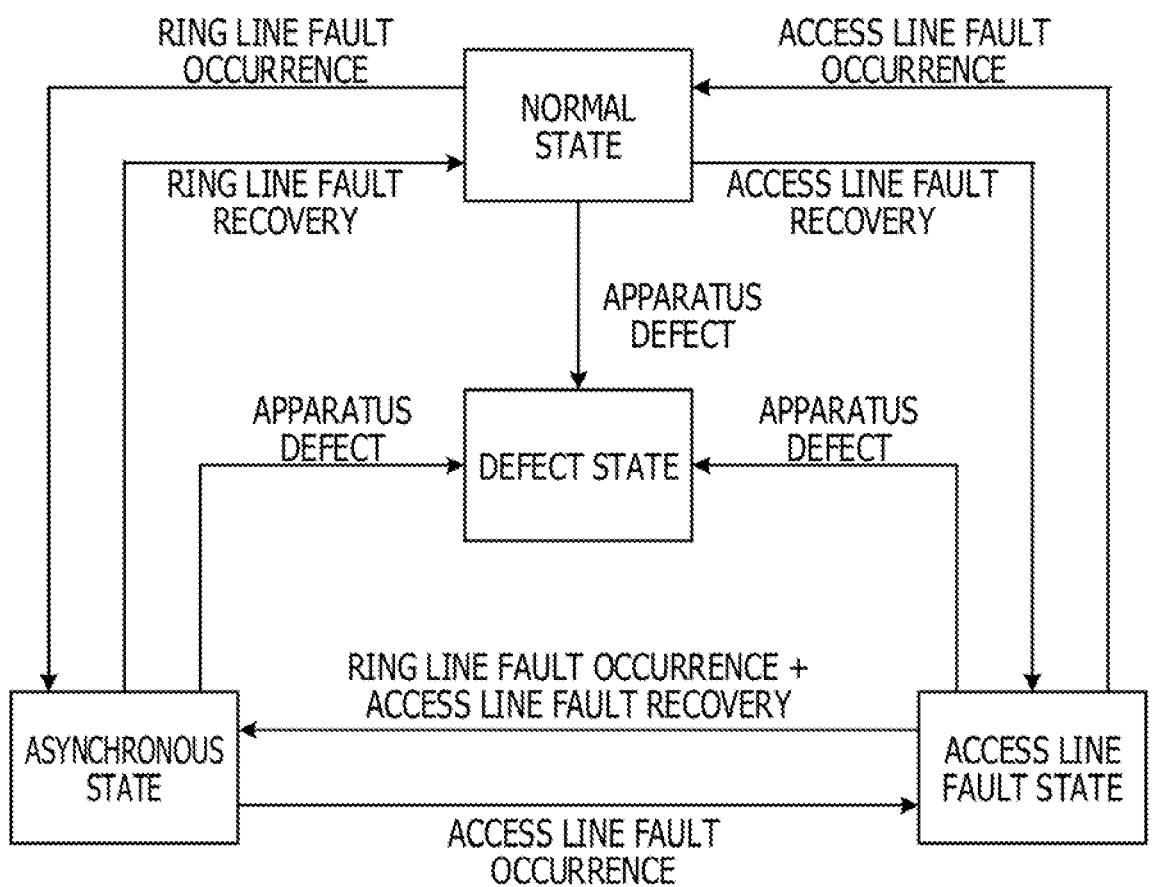
FIG. 18 is a state transition diagram illustrating exemplary states of a ring apparatus managed by a state control section.

FIG. 18 is a state transition diagram illustrating exemplary states of the ring apparatuses 1a and 1b managed by the state control section 100a. State transitions common to FIGS. 8 and 18 will not be redundantly described.

In contrast to the state control section 100 in the foregoing example, the state control section 100a transitions the ring lines Lf1 and Lf2 from the normal state to the asynchronous state in accordance with the occurrence of a fault in either the ring line Lf1 or the ring line Lf2 (see "RING LINE FAULT OCCURRENCE"). In accordance with the fault recovery of either the ring line Lf1 or the ring line Lf2 (see "RING LINE FAULT RECOVERY"), the state control section 100a transitions the ring lines Lf1 and Lf2 from the asynchronous state to the normal state.

In the access line fault state, the state control section 100a transitions the ring apparatuses 1a and 1b into the asynchronous state in accordance with the occurrence of a fault in either the ring line Lf1 or the ring line Lf2 (see "RING LINE FAULT OCCURRENCE") and with the fault recovery of the access lines La to Ld (see "ACCESS LINE FAULT RECOVERY").

As described above, the state control section 100a differs from the state control section 100 in the foregoing example in conditions for transitioning from the normal state or access line fault state to the asynchronous state and in conditions for transitioning from the asynchronous state to the normal state. However, the state control section 100a is similar to the state control section 100 in the control process performed in each state.

For example, in the asynchronous state, the state control section 100a shuts down the port A1x or the port A3x, whichever is not detected to be faulty, in accordance with the detection of a fault in the access line La, as is the case with the operation illustrated in FIG. 6. Therefore, as is the case with the foregoing example, the ring apparatus 1a is able to permit the redundant partner ring apparatus 1b to maintain communication.

In the present example, the duplexed ring lines Lf1 and Lf2 are provided between the ring apparatuses 1a and 1b. However, the configuration is not limited to such duplexing. For example, a part of the bandwidth of the control line Lf in the foregoing example may be used to conduct the main signal Sg. In such an instance, the MCLAG control section 102 may coordinate with the ERP control section 103 to allocate the bandwidth of the main signal Sg.

The above-described embodiment is a preferred embodiment of the present technology. However, the present technology is not limited to the above-described embodiment. It may be understood that various modifications may be made without departing from the spirit of the present technology.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication apparatus comprising:
a first port that is coupled to a first communication apparatus through a ring line;
a second port that is coupled to a second communication apparatus through a second access line, the second communication apparatus being disposed external to the ring line, the second access line being configured redundantly with a first access line between the first communication apparatus and the second communication apparatus;
a third port that is coupled to the first communication apparatus through a control line for transmitting and receiving a control signal concerning the first access line; and
circuitry that detects a fault in the control line and detects a fault in the ring line, the circuitry
detects a fault in the second access line,
switches the second access line from an active line to a standby line in accordance with the detection of the fault in the second access line, and
while the fault in the control line is detected, shuts down the first port in accordance with the detection of the fault in the second access line, and
causes the third port to stop the transmission and reception of the control signal in accordance with the detection of the fault in the ring line, and shuts down the third port in accordance with the detection of a fault in the second access line while the fault in the ring line is detected.

2. The communication apparatus according to claim 1, wherein, when no fault is detected in the control line, the circuitry transmits the control signal for switching the first access line from a standby line to an active line to the first communication apparatus through the control line in accordance with the detection of a fault in the second access line.

3. The communication apparatus according to claim 1, wherein the circuitry
detects a defect in the communication apparatus,
switches the second access line from an active line to a standby line in accordance with the detection of the defect or a fault in the second access line, and
individually shuts down the first port, the second port, and the third port in accordance with the detection of the defect.

4. The communication apparatus according to claim 3, further comprising:
a fourth port that is coupled to a third communication apparatus through the ring line,
wherein, when no fault exists in at least either one of a section between the communication apparatus and the first communication apparatus and a section between the communication apparatus and the third communication apparatus in a case where neither the defect nor a fault in the second access line is detected, the circuitry maintains the second access line as an active line.

5. The communication apparatus according to claim 1, wherein
the first port transmits and receives a main signal and the control signal to and from the first communication apparatus through the ring line,
the third port transmits and receives the main signal and the control signal to and from the first communication apparatus through the control line, and
the circuitry
causes the first port to stop the transmission and reception of the control signal through the ring line in accordance with the detection of a fault in the control line, and shuts down the first port in accordance with the detection of the fault in the second access line while the fault in the control line is detected.

6. A communication system comprising:
a pair of communication apparatuses coupled to a ring line, one of the pair of communication apparatuses includes
a first port that is coupled to an other one of the pair of communication apparatuses through the ring line,
a second port that is coupled to an external communication apparatus through a second access line, the external communication apparatus being disposed external to the ring line, the second access line being configured redundantly with a first access line between the external communication apparatus and the other one of the pair of communication apparatuses,
a third port that is coupled to the other one of the pair of communication apparatuses through a control line for transmitting and receiving a control signal concerning the first access line, and
first circuitry that detects a fault in the control line, detects a fault in the ring line, detects a fault in the second access line, switches the second access line from an active line to a standby line in accordance with the detection of the fault in the second access line, and while the fault in the control line is detected, shuts down the first port in accordance with the detection of the fault in the second access line, and
the other one of the pair of communication apparatuses includes
an access port that is coupled to the external communication apparatus through the first access line, and
second circuitry that detects a fault in the first access line, detects the shutdown of the first port, and while a fault in the control line is detected and no fault in the first access line is detected, switches the first access line from a standby line to an active line in accordance with the detection of the shutdown of the first port,
the first circuitry causes the third port to stop the transmission and reception of the control signal in accordance with the detection of the fault in the ring line, and shuts down the third port in accordance with the detection of a fault in the second access line while the fault in the ring line is detected.

7. The communication system according to claim 6, wherein, when no fault is detected in the control line, the first circuitry transmits the control signal for switching the first access line from a standby line to an active line to the other one of the pair of communication apparatuses through the control line in accordance with the detection of a fault in the second access line.

8. The communication system according to claim 6, wherein the first circuitry
causes one of the pair of communication apparatuses to detect a defect in the one of the pair of communication apparatuses,
causes a first switching section to switch the second access line from an active line to a standby line in accordance with the detection of the defect or a fault in the second access line, and
individually shuts down the first port, the second port, and the third port in accordance with the detection of the defect.

9. The communication system according to claim 8, wherein
the one of the pair of communication apparatuses includes a fourth port that is coupled to another communication apparatus through the ring line, and
the first circuitry maintains the second access line as an active line when no fault exists in at least either one of a section between the one of the pair of communication apparatuses and the other one of the pair of communication apparatuses and a section between the one of the pair of communication apparatuses and the other communication apparatus in a case where neither the defect nor a fault in the second access line is detected.

10. The communication system according to claim 6, wherein
the first port transmits and receives a main signal and the control signal to and from the other one of the pair of communication apparatuses through the ring line,
the third port transmits and receives the main signal and the control signal to and from the other one of the pair of communication apparatuses through the control line, and
the first circuitry causes the first port to stop the transmission and reception of the control signal through the ring line in accordance with the detection of a fault in the control line, and shuts down the first port in accordance with the detection of the fault in the second access line while the fault in the control line is detected.

11. A communication control method that uses a communication apparatus including a first port, a second port, and a third port, the first port being coupled to a first communication apparatus through a ring line, the second port being coupled to a second communication apparatus through a second access line, the second communication apparatus being disposed external to the ring line, the second access line being configured redundantly with a first access line between the first communication apparatus and the second communication apparatus, the third port being coupled to the first communication apparatus through a control line for transmitting and receiving a control signal concerning the first access line, the communication control method comprising:
detecting a fault in the control line;
detecting a fault in the ring line;
detecting a fault in the second access line;
switching the second access line from an active line to a standby line in accordance with the detection of the fault in the second access line; and
while the fault in the control line is detected, shutting down the first port in accordance with the detection of the fault in the second access line; and
causing the third port to stop the transmission and reception of the control signal in accordance with the detection of the fault in the ring line, and shutting down the third port in accordance with the detection of a fault in the second access line while the fault in the ring line is detected.

12. The communication control method according to claim 11, wherein, when no fault is detected in the control line, the control signal for switching the first access line from a standby line to an active line is transmitted to the first communication apparatus through the control line in accordance with the detection of a fault in the second access line.

13. The communication control method according to claim 11, wherein
the communication apparatus detects a defect in the communication apparatus,
the second access line is switched from an active line to a standby line in accordance with the detection of the defect or a fault in the second access line, and
the first port, the second port, and the third port are individually shut down in accordance with the detection of the defect.

14. The communication control method according to claim 13, wherein
the communication apparatus includes a fourth port that is coupled to a third communication apparatus through the ring line, and
the second access line is maintained as an active line when no fault exists in at least either one of a section between the communication apparatus and the first communication apparatus and a section between the communication apparatus and the third communication apparatus in a case where neither the defect nor a fault in the second access line is detected.

15. The communication control method according to claim 11, further comprising:
causing the first port to transmit and receive a main signal and the control signal to and from the first communication apparatus through the ring line;
causing the third port to transmit and receive the main signal and the control signal to and from the first communication apparatus through the control line; and
causing the first port to stop the transmission and reception of the control signal through the ring line in accordance with the detection of a fault in the control line, and while the fault in the control line is detected, shutting down the first port in accordance with the detection of the fault in the second access line.

* * * * *